United States Patent
Oya et al.

(10) Patent No.: US 9,752,036 B2
(45) Date of Patent: Sep. 5, 2017

(54) CURABLE ORGANOPOLYSILOXANE ANTIFOULING COMPOSITE COATING FILM, AND ANTIFOULING SUBSTRATE COATED WITH THE SAME

(71) Applicant: CHUGOKU MARINE PAINTS, LTD., Otake-shi (JP)

(72) Inventors: Masaaki Oya, Otake (JP); Kiwamu Yamane, Otake (JP); Shinichi Tashiro, Otake (JP)

(73) Assignee: CHUGOKU MARINE PAINTS, LTD., Otake-shi (JP)

( * ) Notice: Subject to any disclaimer, the term of this patent is extended or adjusted under 35 U.S.C. 154(b) by 51 days.

(21) Appl. No.: 14/439,110

(22) PCT Filed: Nov. 8, 2013

(86) PCT No.: PCT/JP2013/080331
§ 371 (c)(1),
(2) Date: Apr. 28, 2015

(87) PCT Pub. No.: WO2014/077204
PCT Pub. Date: May 22, 2014

(65) Prior Publication Data
US 2015/0291808 A1    Oct. 15, 2015

(30) Foreign Application Priority Data
Nov. 13, 2012  (JP) ................. 2012-249241

(51) Int. Cl.
| | |
|---|---|
| C09D 5/16 | (2006.01) |
| B32B 15/095 | (2006.01) |
| C09D 5/08 | (2006.01) |
| C09D 175/04 | (2006.01) |
| C09D 183/08 | (2006.01) |
| C08G 18/61 | (2006.01) |
| C08G 77/16 | (2006.01) |
| C08G 77/26 | (2006.01) |

(52) U.S. Cl.
CPC .......... *C09D 5/1693* (2013.01); *B32B 15/095* (2013.01); *C08G 18/61* (2013.01); *C09D 5/08* (2013.01); *C09D 5/16* (2013.01); *C09D 5/1675* (2013.01); *C09D 175/04* (2013.01); *C09D 183/08* (2013.01); *B32B 2255/10* (2013.01); *B32B 2255/26* (2013.01); *B32B 2307/752* (2013.01); *B32B 2307/754* (2013.01); *B32B 2605/12* (2013.01); *C08G 77/16* (2013.01); *C08G 77/26* (2013.01)

(58) Field of Classification Search
CPC ........ C08G 18/61; C08G 77/16; C08G 77/26; C09D 175/04; C09D 183/08; C09D 5/08; C09D 5/16; C09D 5/1675; C09D 5/1693; B32B 15/095; B32B 2255/10; B32B 2255/26; B32B 2307/752; B32B 2307/754; B32B 2605/12

USPC ..................... 428/425.5; 523/122; 427/372.2
See application file for complete search history.

(56) References Cited

U.S. PATENT DOCUMENTS

| | | | | |
|---|---|---|---|---|
| 5,192,603 A | * | 3/1993 | Slater ....................... | B05D 7/54 114/222 |
| 5,958,116 A | | 9/1999 | Kishihara et al. | |
| 6,281,321 B1 | * | 8/2001 | Kelly ................... | C09D 183/10 106/287.11 |
| 2009/0042042 A1 | | 2/2009 | Yuki et al. | |
| 2009/0098384 A1 | | 4/2009 | Hata et al. | |
| 2010/0003211 A1 | * | 1/2010 | Sakamoto ............ | C09D 5/1637 424/78.09 |
| 2010/0278771 A1 | * | 11/2010 | Lobe ...................... | A01N 55/00 424/78.09 |
| 2015/0140324 A1 | * | 5/2015 | Kishimoto ............. | C09J 7/0267 428/336 |

FOREIGN PATENT DOCUMENTS

| | | |
|---|---|---|
| CN | 101155647 A | 3/2006 |
| CN | 101384664 A | 3/2009 |

(Continued)

OTHER PUBLICATIONS

Office Action issued Mar. 8, 2016 in Japanese Patent Application No. 2014-546966.
Extended European Search Report issued Jun. 16, 2016 in Patent Application No. 13855692.3.
Office Action issued Jul. 20, 2016 in Korean Patent Application No. 10-2015-7014858.
Marléne Lejars, et al., "Fouling Release Coatings: A Nontoxic Alternative to Biocidal Antifouling Coatings", Chemical Reviews, vol. 112, No. 8, XP055278451, Aug. 2012, pp. 4347-4390.
M. Esfandeh, et al., "Study of silicone coating adhesion to an epoxy undercoat using silane compounds Effect of silane type and application method", Colloids and Surfaces A: Physicochemical Engineering Aspects, vol. 302, No. 1-3, XP022070861, 2007, pp. 11-16.
International Search Report Issued Feb. 25, 2014 in PCT/JP2013/080331 Filed Nov. 8, 2013.

*Primary Examiner* — Thao T Tran
(74) *Attorney, Agent, or Firm* — Oblon, McClelland, Maier & Neustadt, L.L.P.

(57) ABSTRACT

[Problem] To provide a curable organopolysiloxane antifouling composite coating film obtained by using a urethane resin anticorrosive coating film excellent in curability instead of one or two organopolysiloxane intermediate coating film layers (Tie Coats) to layer an organopolysiloxane antifouling coating film excellent in both interlayer adhesiveness with the anticorrosive coating film and antifouling performance; and an antifouling substrate coated with the composite coating film.
[Solution] An antifouling composite coating film, comprising a laminated urethane resin anticorrosive coating film and antifouling coating film,
(I) the urethane resin anticorrosive coating film being formed from an anticorrosive paint composition comprising a main agent selected from the group consisting of polyols and glycidyl ethers, and an isocyanate curing agent,
(II) the antifouling coating film being formed from a curable polysiloxane composition comprising specific components (a), (b), and (c).

10 Claims, No Drawings

(56) References Cited

FOREIGN PATENT DOCUMENTS

| | | |
|---|---:|---:|
| CN | 101624502 A | 1/2010 |
| EP | 0 532 273 A1 | 3/1993 |
| JP | 2522854 | 8/1996 |
| JP | 2814526 | 10/1998 |
| JP | 10 316933 | 12/1998 |
| JP | 3176396 | 6/2001 |
| JP | 2002 200455 | 7/2002 |
| JP | 2003 205572 | 7/2003 |
| JP | 2003 327912 | 11/2003 |
| JP | 2005-296836 A | 10/2005 |
| JP | 2006 82414 | 3/2006 |
| JP | 2007 245141 | 9/2007 |
| JP | 2010 13591 | 1/2010 |
| JP | 2010-22997 A | 2/2010 |
| JP | 2011 235457 | 11/2011 |

\* cited by examiner

CURABLE ORGANOPOLYSILOXANE ANTIFOULING COMPOSITE COATING FILM, AND ANTIFOULING SUBSTRATE COATED WITH THE SAME

TECHNICAL FIELD

The present invention relates to a curable organopolysiloxane antifouling composite coating film comprising a urethane resin anticorrosive coating film and a curable organopolysiloxane antifouling coating film and to an antifouling substrate coated with the composite coating film.

BACKGROUND ART

A coating film formed from a curable organopolysiloxane paint composition as an antifouling coating film for preventing the deposition of aquatic organisms on underwater structures is useful as a substitute for a conventional antifouling coating film containing a harmful substance such as an organic metal. The curable organopolysiloxane antifouling coating film is laminated over the upper layer of an epoxy resin anticorrosive coating film formed on the surface of a base material such as steel from the viewpoint of anticorrosion properties and is generally used as a curable organopolysiloxane antifouling composite coating film.

The curable organopolysiloxane antifouling composite coating film has been conventionally kept an adhesive force between the coating film layers by interposing one or two organopolysiloxane intermediate coating film layers (Tie Coats) between an organopolysiloxane antifouling coating film layer (Finish Coat) and an epoxy anticorrosive coating film layer (Under Coat) to make the whole antifouling composite coating film have a three- or four-layer coating film structure.

However, such an antifouling composite coating film with a multilayer coating film structure has a problem that a coating work period is prolonged to increase a cost, although long-term antifouling properties are obtained.

Patent Literature 1 by the present applicant proposes, for example, a curable organopolysiloxane antifouling composite coating film obtained by directly laminating, on a surface of an epoxy resin anticorrosive coating film, an organopolysiloxane antifouling coating film excellent in both interlayer adhesiveness with the anticorrosive coating film and antifouling performance.

The antifouling composite coating film is a curable organopolysiloxane antifouling composite coating film comprising: [I] an epoxy resin anticorrosive coating film formed from [i] an anticorrosive paint composition comprising (e1) an epoxy resin and (e2) an amine curing agent for an epoxy resin; and [II] an antifouling coating film formed from [ii] an antifouling paint composition comprising a curable organopolysiloxane composition comprising components (A), (B) and (C) below, directly laminated on a surface of the epoxy resin anticorrosive coating film, wherein the curable organopolysiloxane composition is a three-component curable organopolysiloxane composition comprising: (A) a main agent comprising an organopolysiloxane (a1) having at least two condensation reactive groups in one molecule and silica (a2); (B) a curing agent comprising an organosilane having a functional group that can be condensation-reacted with the condensation reactive groups of the above organopolysiloxane (a1) having at least two condensation reactive groups in one molecule and/or a partial hydrolysate thereof (b1); and a curing accelerator (C) containing at least one tin compound (ac) selected from the group consisting of specific tin compounds.

In other words, the antifouling composite coating film according to Patent Literature 1 is obtained by directly laminating the organopolysiloxane antifouling coating film excellent in antifouling performance on the epoxy resin anticorrosive coating film by improving a special tin catalyst.

However, the antifouling composite coating film described in Patent Literature 1 has had problems that when abase coating film is an epoxy resin, coating under low temperature conditions is difficult, curability under an extreme condition (at a low temperature (0° C.)) is poor, and adhesiveness is deteriorated at a low temperature.

Patent Literature 2 proposes an antifouling and anticorrosive coated steel material comprising: an undercoat layer prepared by coating or covering a steel material with an anticorrosive material which is a urethane paint or a polyethylene resin; an intermediate coat layer prepared by coating a paint containing 3% by weight or more of silicone rubber on the undercoat layer; and a top coat layer prepared by applying a silicone rubber paint onto the intermediate coat layer.

However, a urethane intermediate coating paint containing several percent of a silicone component is needed between urethane and silicone antifouling laminated coating films.

Patent Literature 3 proposes an adhesive composition comprising a hydroxyl group-containing urethane resin, an isocyanate compound and 0.02 to 1.5% of an imidazole compound.

However, Patent Literature 3 is directed at an adhesive agent and does not describe a composite coating film including a silicone antifouling coating film.

Such a room-temperature-curable silicone rubber has been excellent in mold release properties and softness but has been susceptible to improvement in adhesiveness and antifouling properties. In general, antifouling properties tend to deteriorate due to improvement in adhesiveness while adhesiveness tends to deteriorate due to improvement in antifouling properties.

CITATION LIST

Patent Literatures

Patent Literature 1: JP-A 2007-245141
Patent Literature 2: JP-B 2814526
Patent Literature 3: JP-B 3176396

SUMMARY OF INVENTION

Technical Problem

The present invention has been achieved for solving the above problems and an object thereof is to provide a curable organopolysiloxane antifouling composite coating film obtained by using a urethane resin anticorrosive coating film excellent in curability instead of one or two organopolysiloxane intermediate coating film layers (Tie Coats), and by laminating an organopolysiloxane antifouling coating film excellent in both interlayer adhesiveness with the anticorrosive coating film and antifouling performance; and to provide an antifouling substrate coated with the composite coating film.

Solution to Problem

The present inventor extensively examined the constitution of an antifouling composite coating film in order to solve the above problems. It was found in the process of the examination that adding a specific amino group-containing alkoxysilane into a curable organopolysiloxane antifouling paint composition results in improvement in adhesiveness due to interaction with the isocyanate of a urethane resin coating film, in development of adhesiveness of an organopolysiloxane antifouling coating film to an urethane resin coating film even when an interval between coating with an urethane resin paint and coating with a curable organopolysiloxane antifouling paint for a top coat is short, and in formation of an organopolysiloxane antifouling coating film having both good antifouling performance and good coating film strength performance, and the present invention was thus accomplished.

At a low temperature in winter, the interval between the first coating and the second coating is usually one or more days since drying of a coating film requires one or more days. On the other hand, in the present invention, the surface of a urethane coating film is quickly cured by increasing the rate of curing a urethane coating and good adhesiveness can be developed even if a silicone is coated on the same day (6 hours later). Further, in the case of silicone coating for a ship, the coating is generally performed in a silicone coating area after finishing a general coating other than the silicone coating to prevent a silicone component from causing poor adhesiveness in other portions.

Therefore, a shorter coating interval between the silicone coating and the coating of the lower layer thereof makes it possible to shorten time that elapses before finishing the coating and is a merit in processes. Furthermore, coating is easily affected by weather in actual sites and the possibility of coating on the same day is extremely effective at shortening an execution period and at forming a high-quality coating film.

The antifouling composite coating film of the present invention for solving the above problems is an antifouling composite coating film, comprising:

(I) a urethane resin anticorrosive coating film formed from an anticorrosive paint composition comprising a main agent selected from the group consisting of polyols and glycidyl ethers, and an isocyanate curing agent, and (II) an antifouling coating film formed from a curable polysiloxane composition comprising components (a), (b), and (c) below, the urethane resin anticorrosive coating film (I) and the antifouling coating film (II) being laminated, (a) a diorganopolysiloxane having at least two functional groups in one molecule, (b) an organosilane having at least two hydroxyl groups or hydrolyzable groups in one molecule and/or a partial hydrolysis-condensate thereof, (c) an amino group-containing alkoxysilane represented by the following general formula (1) and/or a reaction product thereof:

wherein $R^1$ represents an alkylene group having 1 to 10 carbon atoms;

$R^2$ represents an alkyl group having 1 to 10 carbon atoms, an alkenyl group having 2 to 5 carbon atoms, or an aryl group having 6 to 12 carbon atoms;

$R^3$ represents an alkyl group having 1 to 10 carbon atoms;

X is a group represented by $R^4R^5N$— or $R^6R^7C$=N—, wherein $R^4$ represents a hydrogen atom, an alkyl group having 1 to 10 carbon atoms, an alkenyl group having 2 to 5 carbon atoms, an aryl group having 6 to 12 carbon atoms, or $H_2N(CH_2)_p(NH(CH_2)_q)_r$—, wherein p and q are integers of 2 to 5, and r is an integer of 0 to 5; $R^5$ represents a hydrogen atom, an alkyl group having 1 to 10 carbon atoms, an alkenyl group having 2 to 5 carbon atoms, or an aryl group having 6 to 12 carbon atoms; and $R^6$ and $R^7$ each independently represent a hydrogen atom, an alkyl group having 1 to 10 carbon atoms, an alkenyl group having 2 to 5 carbon atoms, or an aryl group having 6 to 12 carbon atoms; and n is an integer of 0 to 2.

The lamination order of the film (I) and the film (II) with respect to a surface of a substrate is such that the surface of the substrate, the film (I) and the film (II) are positioned in this order.

In the antifouling composite coating film of the present invention, the functional groups of the diorganopolysiloxane (a) are preferably selected from the group consisting of a hydroxyl group, an iminoxy group, an amino group, an acetyloxy group, and an alkoxy group.

In the antifouling composite coating film of the present invention, the organosilane and/or the partial hydrolysis-condensate thereof (b) is preferably represented by the following general formula (2):

wherein $R^8$ represents a hydrocarbon group having 1 to 6 carbon atoms; Y represents a hydroxyl group or a hydrolyzable group; and d is an integer of 0 to 2.

In the antifouling composite coating film of the present invention, Y in the general formula (2) is preferably selected from the group consisting of a hydroxyl group, an iminoxy group, an acetyloxy group, and an alkoxy group.

In the antifouling composite coating film of the present invention, the anticorrosive paint composition preferably contains a tertiary amine compound as a catalyst for accelerating curing.

In the antifouling composite coating film of the present invention, the amino group-containing alkoxysilane (c) is preferably γ-aminopropyltrimethoxysilane.

The antifouling composite coating film of the present invention preferably contains 0.001 to 5 parts by weight of the amino group-containing alkoxysilane (c) based on 100 parts by weight of the solid contents of the curable polysiloxane composition (i.e., components excluding optional solvents).

It is preferable that the main agent is a polyol and the isocyanate curing agent is a polyisocyanate in the anticorrosive paint composition, which constitutes the antifouling composite coating film of the present invention.

The anticorrosive paint composition has a ratio of the equivalent of an isocyanate group contained in a polyisocyanate to the equivalent of a hydroxyl group contained in a polyol [NCO group/OH group] is preferably 0.3/1.0 to 2.0/1.0 in the anticorrosive paint composition, which constitutes the antifouling composite coating film of the present invention.

An antifouling substrate of the present invention for solving the above problems is characterized in that the antifouling composite coating film described above is laminated on a surface of a substrate in order of substrate/coating film (I)/coating film (II).

According to this invention, the antifouling composite coating film is laminated on the surface of the substrate in the order of substrate/coating film (I)/coating film (II). Therefore, there can be obtained the antifouling composite coating film, wherein a cured organopolysiloxane antifouling coating film layer excellent in interlayer adhesiveness with the anticorrosive coating film layer is laminated directly on the urethane anticorrosive coating film layer without interposing one or two organopolysiloxane intermediate coating film layers (Tie Coats). Accordingly, shortening of a coating work period, cost reduction, and the like are realized. Furthermore, there can be obtained the antifouling composite coating film, wherein a cured organopolysiloxane antifouling coating film layer, which has been unavailable to laminate on a commonly used epoxy resin coating film at a low temperature due to poor curability, is laminated on an under coat with good adhesiveness even when the coating is carried out at a very low temperature (0° C.).

In the antifouling substrate of the present invention, the substrate is preferably an underwater structure or a ship.

According to this invention, since the substrate is an underwater structure or a ship, an antifouling coating film is formed to cover the substrate such as an underwater structure and a ship and can exert good antifouling performance.

A method for producing an antifouling substrate of the present invention for solving the above problems comprises laminating the antifouling composite coating film described above on a surface of a substrate in order of substrate/coating film (I)/coating film (II).

According to this invention, the antifouling composite coating film is laminated on the surface of the substrate in the order of substrate/(I)/(II). Therefore, adding a specific amino group-containing alkoxysilane into a curable organopolysiloxane antifouling paint composition results in improvement of adhesiveness between an organopolysiloxane coating film and a urethane resin coating film due to an interaction of the amino group-containing alkoxysilane with an isocyanate of the urethane resin coating film, and adding a specific tertiary amine into the urethane resin paint results in improvement of curability of the urethane resin paint at low temperature. Further, there can be formed an organopolysiloxane antifouling coating film that exerts adhesiveness of the organopolysiloxane antifouling coating film to an urethane resin coating film even when an interval between coating of the urethane resin paint and coating of the curable organopolysiloxane antifouling paint for a top coat is short, and exerts good antifouling performance and coating film strength performance.

Advantageous Effects of Invention

According to the antifouling composite coating film of the present invention and the antifouling substrate coated with the antifouling composite coating film, there can be provided an antifouling composite coating film, wherein a cured organopolysiloxane antifouling coating film layer excellent in interlayer adhesiveness with the anticorrosive coating film layer is laminated directly on the urethane anticorrosive coating film layer without interposing one or two organopolysiloxane intermediate coating film layers (Tie Coats). Accordingly, shortening of a coating work period, cost reduction, and the like are realized. Furthermore, there can be provided the antifouling composite coating film, wherein a cured organopolysiloxane antifouling coating film layer, which has been unavailable to laminate on a commonly used epoxy resin coating film at a low temperature due to poor curability, is laminated on an under coat with good adhesiveness even when the coating is carried out at a very low temperature (0° C.).

DESCRIPTION OF EMBODIMENTS

The antifouling composite coating film of the present invention and the antifouling substrate coated with the antifouling composite coating film are explained in detail below. The present invention is not limited to embodiments below and various modifications within the gist thereof can be carried out.

The antifouling composite coating film of the present invention is an antifouling composite coating film, wherein (I) a urethane resin anticorrosive coating film formed from an anticorrosive paint composition comprising a main agent selected from the group consisting of polyols and glycidyl ethers, and an isocyanate curing agent; and (II) an antifouling coating film formed from a curable polysiloxane composition comprising components (a), (b), and (c) (hereinafter also referred to as an "antifouling paint composition") below are laminated in order of (I) and (II) from a surface of a substrate.

(a) a diorganopolysiloxane having at least two functional groups in one molecule;

(b) an organosilane having at least two hydroxyl groups or hydrolyzable groups in one molecule and/or a partial hydrolysis-condensate thereof;

(c) an amino group-containing alkoxysilane represented by the following general formula (1) and/or a reaction product thereof:

$$X-R^1-SiR^2_n(OR^3)_{3-n} \quad (1)$$

wherein $R^1$ represents an alkylene group having 1 to 10 carbon atoms;

$R^2$ represents an alkyl group having 1 to 10 carbon atoms, an alkenyl group having 2 to 5 carbon atoms, or an aryl group having 6 to 12 carbon atoms;

$R^3$ represents an alkyl group having 1 to 10 carbon atoms;

X is a group represented by $R^4R^5N-$ or $R^6R^7C=N-$, wherein $R^4$ represents a hydrogen atom, an alkyl group having 1 to 10 carbon atoms, an alkenyl group having 2 to 5 carbon atoms, an aryl group having 6 to 12 carbon atoms, or $H_2N(CH_2)_p(NH(CH_2)_q)_r-$, wherein p and q are integers of 2 to 5, and r is an integer of 0 to 5; $R^5$ represents a hydrogen atom, an alkyl group having 1 to 10 carbon atoms, an alkenyl group having 2 to 5 carbon atoms, or an aryl group having 6 to 12 carbon atoms; and $R^6$ and $R^7$ each independently represent a hydrogen atom, an alkyl group having 1 to 10 carbon atoms, an alkenyl group having 2 to 5 carbon atoms, or an aryl group having 6 to 12 carbon atoms; and n is an integer of 0 to 2.

Each component is sequentially explained below.

(I) Urethane Resin Anticorrosive Coating Film Formed from an Anticorrosive Paint Composition Containing a Main Agent Selected from the Group Consisting of Polyols and Glycidyl Ethers, and an Isocyanate Curing Agent The urethane resin anticorrosive coating film (I), which is formed to be brought into intimate contact with the surface of the substrate, is obtained by coating and curing the anticorrosive paint composition comprising the main agent, preferably a polyol, and the isocyanate curing agent, preferably a polyisocyanate.

<Anticorrosive Paint Composition>

The anticorrosive paint composition preferably comprises a polyol and a polyisocyanate as the curing agent.

(Polyol)

Polyols used as the main agent for this kind of paint composition can be used without particular limitation. Specific examples thereof include:

polyhydric alcohols such as dihydric alcohols such as ethylene glycol, diethylene glycol, triethylene glycol, tetramethylene glycol, butanediol, hexanediol, polyethylene glycol, propylene glycol, dipropylene glycol, tripropylene glycol, polypropylene glycol, butylene glycol, dibutylene glycol, tributylene glycol, polybutylene glycol, 1,5-pentanediol, neopentyl glycol, 1,6-hexanediol, 1,10-decanediol, alkanediol, and cyclohexanedimethanol;

trihydric alcohols such as glycerol, trimethylolpropane (TMP), 1,2,6-hexantriol, trimethylolethane, 2,4-dihydroxy-3-hydroxymethylpentane, 1,1,1-tris(bishydroxymethyl)propane, and 2,2-bis(hydroxymethyl)butanol-3;

tetrahydric alcohols such as pentaerythritol and diglycerol;

pentahydric alcohols (pentites) such as arabite, ribitol, and xylitol; and hexahydric alcohols (hexites) such as sorbit, mannite, galactitol, and allodulcite;

polyether polyol resins obtained by condensation reaction of polyhydric alcohols and the like represented by polyglycol compounds having not more than around 10 carbon atoms such as polyvalent hydroxy compounds such as polyglycerol and polytetramethylene glycol, and trimethylolpropane;

polyester polyol resins obtained by condensation reaction of polybasic acids such as adipic acid, azelaic acid, sebacic acid, terephthalic acid, isophthalic acid, phthalic acid, and succinic acid with dihydric alcohols such as propylene glycol, ethylene glycol, tetramethylene glycol, butanediol, hexanediol, and neopentyl glycol;

polyester polyol resins obtained by condensation reaction of polyhydric alcohols (specific examples: those of the above polyhydric alcohols) with polybasic acids (specific examples: those of the above polybasic acids);

polyol resins comprising a linear polymer obtained by addition polymerization reaction of resins having two or more active hydroxyl groups such as castor oil with active isocyanate compounds such as aromatic diisocyanates such as 4,4'-diphenylmethane diisocyanate (MDI), tolylene diisocyanate (TDI) and xylylene diisocyanate (XDI), aliphatic diisocyanates such as hexamethylene diisocyanate (HDI) and lysine methyl ester diisocyanate (LDI), and alicyclic diisocyanates such as dicyclohexylmethane diisocyanate (HMDI) and isophorone diisocyanate (IPDI);

polyester polyols derived from glycidyl esters (e.g., Cardura E10, manufactured by Japan Epoxy Resins Co. Ltd.) or glycidyl ethers, polyvalent carboxylic acids (specific examples: those of the above polybasic acids), and polyhydric alcohols (specific examples: those of the above polyhydric alcohols); and polyester polyols, epoxy polyols (alkanolamine-modified epoxy), polyether polyols, acrylic polyols or the like derived from phthalic anhydride, isophthalic acid, sebacic acid, fatty acid, epoxy resins, polyhydric alcohols (specific examples: those of the above polyhydric alcohols) or the like.

Especially, polyester polyols are preferred.

Examples of preferred commercial products served as the polyols includes "PHTHALKYD 806" (manufactured by Hitachi Chemical Company, Ltd.)

As the main agent, glycidyl ethers such as bisphenol A glycidyl ether, hydrogenated bisphenol A glycidyl ether, bisphenol F glycidyl ether, and novolac-type epoxy may also be used.

(Polyisocyanate)

A polyisocyanate acts as the curing agent. Polyisocyanates used as the curing agent for this kind of paint composition can be used without particular limitation. Specific examples thereof include diisocyanates such as hexamethylene diisocyanate (HDI), xylylene diisocyanate (XDI), 1,3-bis(isocyanatomethyl)cyclohexane (hydrogenated XDI, H6XDI), tolylene diisocyanate (TDI), diphenylmethane diisocyanate (MDI), 4,4-bis(isocyanatocyclohexyl)methane (hydrogenated MDI), naphthylene diisocyanate (NDI), isophorone diisocyanate (IPDI), meta-xylylene diisocyanate (MXDI), lysine diisocyanate (2,6-diisocyanate methylcaproate) (LDI), methylcyclohexane-2,4 (or 2,6)-diisocyanate (hydrogenated TDI or HTDI), trimethylhexamethylene diisocyanate (TMDI), dimer acid diisocyanate (DDI), tolidine diisocyanate (TODI), p-phenylene diisocyanate, transcyclohexane-1,4-diisocyanate, and tetramethylxylene diisocyanate (TMXDI); triisocyanates such as triphenylmethane triisocyanate, tris(isocyanatephenyl)thiophosphate, lysine ester triisocyanate, 1,6,11-undecanetriisocyanate, 1,8-diisocyanate-4-isocyanatemethyloctane, 1,3,6-hexamethylenetriisocyanate, and bicycloheptane triisocyanate. Isocyanate compounds derived therefrom can also be used without particular limitation as long as the isocyanate compounds are used as the curing agents for this kind of paint composition.

Furthermore, adducts or isocyanurates, derived from the isocyanates described above may also be used as the curing agent. Specific examples of polyisocyanates other than the above compounds include (A) an adduct by addition polymerization of an aliphatic polyhydric alcohol (i), which is tri- or multi-hydric, with tolylene diisocyanate (TDI), xylylene diisocyanate (XDI), meta-xylylene diisocyanate (MXDI), hexamethylene diisocyanate (HDI or HMDI), isophorone diisocyanate (IPDI), or bis(isocyanatemethyl)cyclohexane (hydrogenated XDI, H6XDI); and (B) an isocyanurate structure (nurate structure) comprising hexamethylene diisocyanate (HDI or HMDI), isophorone diisocyanate (IPDI), or bis(isocyanatemethyl)cyclohexane. Specific examples of the aliphatic polyhydric alcohol (i), which is tri- or multi-hydric, used as a constituent of the adducts include trihydric alcohols such as glycerol, trimethylolpropane (TMP), 1,2,6-hexantriol, trimethylolethane, 2,4-dihydroxy-3-hydroxymethylpentane, 1,1,1-tris(bishydroxymethyl)propane, and 2,2-bis(hydroxymethyl)butanol-3; tetrahydric alcohols such as pentaerythritol and diglycerol; pentahydric alcohols (pentites) such as arabite, ribitol, and xylitol; and hexahydric alcohols (hexites) such as sorbit, mannite, galactitol, and allodulcite. Trimethylolpropane and pentaerythritol are particularly preferred.

Examples of the adducts that are preferably used in the present invention include a compound having two or more active isocyanate groups, such as an isocyanate compound (CORONATE L: Nippon Polyurethane Industry Co., Ltd.) obtained by reacting polymeric MDI or TDI with trimethylolpropane; an isocyanate compound (CORONATE HL: Nippon Polyurethane Industry Co., Ltd.) obtained by reacting HDI with trimethylolpropane; and an isocyanate compound comprising a urethane prepolymer having an active isocyanate group obtained by reacting polymeric MDI with hydrogenated hydroxyl-terminated polybutadiene glycol.

(Blending Rate)

In the present invention, each component of the polyol and the polyisocyanate contained in the anticorrosive paint composition is used in an amount such that the ratio of the equivalent of an isocyanate group contained in the polyisocyanate to the equivalent of a hydroxyl group contained in the polyol [NCO group/OH group] is 0.3/1.0 to 2.0/1.0, preferably 0.9/1.0 to 1.2/1.0. This range results in the improved water resistance of a coating film and is preferred from the viewpoint of long-term anticorrosion properties.

A tertiary amine compound can also be used as a catalyst for accelerating curing in the anticorrosive paint composition in order to enhance low-temperature curability. Specific examples include imidazole, an octylate or phenol salt of DBU [1,8-diazabicyclo-(5,4,0)undecene-7] manufactured by San-Apro, Ltd., an octylate salt of DBN [1,5-diazabicyclo-(4,3,0)nonene-5], trimethylamine, dimethylethylamine, triethylamine, tributylamine, dimethylbenzylamine, dimethylcyclohexylamine, dimethylethanolamine, diethylethanolamine, triethanolamine, pyridine, 4-phenylpropylpyridine, 2,4,6-collidine, quinoline, isoquinoline, N-ethylmorpholine, and triethylenediamine. The anticorrosive paint composition, which contains a solvent and the like, may contain the tertiary amine compound in an amount of less than 1% by weight, preferably 0.01% or more and less than 1% by weight, further preferably 0.03% or more and less than 0.5% by weight, particularly preferably 0.03% or more and 0.2% or less by weight.

Furthermore, a clear coating film can also be formed by using the anticorrosive paint composition as a clear coating that does not contain a pigment or the like. The anticorrosive paint composition may also contain known additives for a coating such as a color pigment and a dispersing agent without loss of an object of the present invention.

In addition, other optional components such as fillers, anti-sagging/anti-settling agents (thixotropic agents) may also be blended. These are explained in "(II) the antifouling coating film" below.

(II) Antifouling Coating Film Formed from Curable Polysiloxane Composition Comprising Components (a), (b), (c), (d), and (e)

<Curable Polysiloxane Composition>

((a) Diorganopolysiloxane Having at Least Two Functional Groups in One Molecule)

The diorganopolysiloxane (a) has at least two functional groups in one molecule. Specifically, preferred is a polymer represented by the following general formula (4):

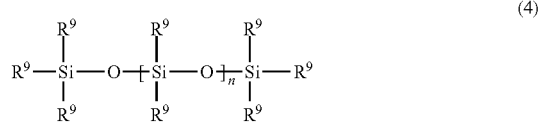

(4)

In the above formula (4), $R^9$ may be the same or different from each other and represents a functional group or a monovalent hydrocarbon group having 1 to 12 carbon atoms, provided that at least two of $R^9$ represent functional groups. n is an integer of 250 to 2500, preferably 350 to 1500.

Examples of the functional group include a hydrolyzable group such as a hydroxyl group, an alkoxy group, an acetyloxy group, an alkenyloxy group, an iminoxy group, an amino group, an amide group, and an aminooxy group, and a hydroxyl group, an iminoxy group, an amino group, an acetyloxy group, or an alkoxy group is preferred in view of reactivity and the like.

The iminoxy group preferably has around 3 to 10 carbon atoms. Examples thereof include a dimethylketooxime group, a methylethylketooxime group, and a diethylketooxime group.

The amino group preferably has 1 to 10 carbon atoms in total. Examples thereof include an N-methylamino group, an N-ethylamino group, an N-propylamino group, an N-butylamino group, an N,N-dimethylamino group, an N,N-diethylamino group, and a cyclohexylamino group.

The acetyloxy group is preferably an aliphatic acetyloxy group having 1 to 10 carbon atoms or an aromatic acetyloxy group having 6 to 12 carbon atoms. Examples thereof include an acetoxy group, a propyloxy group, a butyloxy group, and a benzoyloxy group.

The alkoxy group preferably has 1 to 10 carbon atoms in total, and may have an oxygen atom (ether bond) at one or more sites between carbon atoms. Examples thereof include a methoxy group, an ethoxy group, a propoxy group, a butoxy group, a methoxyethoxy group, and an ethoxyethoxy group.

The organopolysiloxane (a) is preferably an organopolysiloxane that independently has, at both terminals of the molecule, functional groups selected from the group consisting of a hydroxyl group, an iminoxy group, an amino group, an acetyloxy group, and an alkoxy group in view of reactivity and the like, and is particularly preferably an organopolysiloxane that has a hydroxyl group at both terminals of the molecule (α,ω-dihydroxy-functional siloxane).

Examples of the monovalent hydrocarbon group having 1 to 12 carbon atoms in the above general formula (4) include an alkyl group, an alkenyl group, an aryl group, a cycloalkyl group, an aralkyl group. The monovalent hydrocarbon group may be substituted or unsubstituted.

The alkyl group may be a straight-chain, branched-chain or alicyclic alkyl group. Examples include a methyl group, an ethyl group, a propyl group, a butyl group, a 2-ethylbutyl group, and an octyl group.

Examples of the alkenyl group include a vinyl group, a hexenyl group, and an allyl group.

Examples of the aryl group include a phenyl group, a tolyl group, a xylyl group, a naphthyl group, and a diphenyl group.

Examples of the cycloalkyl group include a cyclohexyl group, and a cyclopentyl group.

Examples of the aralkyl group include a benzyl group, and a 2-phenylethyl group. Among them, unsubstituted methyl and phenyl groups are preferred.

The organopolysiloxane (a) represented by the above general formula (4) usually has a number average molecular weight of 20,000 to 170,000, preferably 25,000 to 100,000. Further, the organopolysiloxane (a) has a viscosity at 25° C. of 500 to 1,000,000 mPa·s, preferably 1,000 to 100,000 mPa·s.

The organopolysiloxane (a) is contained in an amount of usually 20 to 90% by weight, preferably 30 to 80% by weight, in the antifouling paint composition containing a solvent and the like to exert good antifouling properties. Further, the organopolysiloxane (a) is contained in an amount of usually 25 to 95% by weight, preferably 35 to 85% by weight based on 100% by weight of the solid content of the antifouling paint composition.

As the organopolysiloxanes (a), marketed organopolysiloxanes can be used. Examples include "YF3057" (manufactured by Toshiba Silicone Co., Ltd.) having a hydroxyl group, "KE45" (manufactured by Shin-Etsu Chemical Co., Ltd.) having an iminoxy group, and "KE489" (manufactured by Shin-Etsu Chemical Co., Ltd.) having an alkoxy group.

(Silica)

The diorganopolysiloxane may be kneaded with silica before use.

Examples of the silica used in the present invention include a hydrophilic silica (untreated-surface silica) such as a wet-process silica (hydrated silica) and a dry-process silica (fumed silica, anhydrous silica), and a surface-treated hydrophobic silica such as a hydrophobic wet silica and a hydrophobic fumed silica. They may be used alone or in combination of two or more.

As the wet-process silica, a silica that has an adsorption moisture content of around 4 to 8%, a bulk density of 200 to 300 g/L, a primary particle diameter of 10 to 30 μm, and a specific surface area (BET surface area) of 10 m²/g or more can be used without particular limitation.

As the dry-process silica, a silica that, for example, has a moisture content of 1.5% or less, a bulk density of 50 to 100 g/L, a primary particle diameter of 8 to 20 μm, and a specific surface area of 10 m²/g or more can be used without particular limitation.

The hydrophobic fumed silica is prepared by subjecting dry-process silica to surface treatment with an organosilicon compound such as methyltrichlorosilane, dimethyldichlorosilane, hexamethyldisilazane, hexamethylcyclotrisiloxane, and octamethylcyclotetrasiloxane. The hydrophobic fumed silica has a small water adsorption over time and usually has a moisture content of 0.3% or less, often 0.1 to 0.2%. As the hydrophobic fumed silica, the one that, for example, has a primary particle diameter of 5 to 50 ram, a bulk density of 50 to 100 g/L, and a specific surface area of 10 m²/g or more can be used without particular limitation.

In addition, a heat-treated hydrophobic fumed silica produced when a silica is subjected to heat treatment with the above-mentioned diorganopolysiloxane, in which moisture adsorbed on the surface of the silica is physically reduced and removed as described below, usually has a moisture content of 0.2% or less, preferably 0.1% or less, further preferably 0.05 to 0.1%. The other physical property values such as bulk density remain similar to those of the hydrophobic silica.

As the silica, commercial products are available. Examples include "R974" and "RX200" manufactured by Nippon Aerosil Co., Ltd.

The diorganopolysiloxane and the silica in the main agent in the present invention (described below) are preferably heat-treated products formed by previously heat-treating the diorganopolysiloxane and the silica or a mixture of the heat-treated products with the diorganopolysiloxane that is not heat-treated. This is because previously heat-treating the silica with a part or all of the diorganopolysiloxane contributes to effects of, e.g., improving an affinity between both components to inhibit the aggregation of the silica. The heat treatment is performed, for example, under normal or reduced pressure, at 100° C. or more and not more than the decomposition temperature of the blended components, preferably at 100 to 300° C., further preferably at 140 to 200° C., usually for 3 to 30 hours.

The silica is blended at a rate of usually 1 to 100 parts by weight, preferably 2 to 50 parts by weight, further preferably 5 to 30 parts by weight, based on 100 parts by weight of the diorganopolysiloxane. An amount of the blended silica of less than the above range may result in insufficient coating film strength, coating film hardness and thixotropy properties to make it impossible to obtain a desired film thickness by one coating, particularly spray coating. An amount of the blended silica of more than the above range may result in the excessively increased viscosity of the paint.

The use of the silica as described above contributes to such effects that stability during preparation or storage of the obtained antifouling paint composition is increased, fluidity and thixotropy properties become good, a coating film having a sufficient thickness can be formed even on a perpendicularly coated surface by a small number of times of coating, the obtained coating film is further excellent in physical properties such as hardness, tensile strength, and elongation in good balance, and antifouling properties are also excellent.

((b) Organosilane Having at Least Two Hydroxyl Groups or Hydrolyzable Groups in One Molecule and/or Partial Hydrolysis-Condensate Thereof)

The organosilane and/or the partial hydrolysis-condensate thereof are a compound represented by the following general formula (2) and/or a partial hydrolysis-condensate thereof.

$$R^8_d SiY_{4-d} \qquad (2)$$

In the formula (2), $R^8$ represents a hydrocarbon group having 1 to 6 carbon atoms, for example, straight-chain and branched alkyl groups such as a methyl group, an ethyl group, and a propyl group; a cyclic alkyl group such as a cyclohexyl group; an alkenyl group such as a vinyl group; and an aryl group such as a phenyl group, preferably a methyl group and an ethyl group.

In the formula (2), Y represents a hydroxyl group or a hydrolyzable group and examples include an iminoxy group, an acetyloxy group, an alkoxy group, an acyloxy group, an alkenyloxy group, an amino group, an amide group, and an aminooxy group, preferably an alkoxy group.

The acetyloxy group is preferably an aliphatic acetyloxy group having 1 to 10 carbon atoms or an aromatic acetyloxy group having 6 to 12 carbon atoms and examples include an acetoxy group, a propyloxy group, a butyloxy group, and a benzoyloxy group.

The alkoxy group preferably has 1 to 10 carbon atoms in total, oxygen atoms may exist at one or more sites between carbon atoms, and examples include a methoxy group, an ethoxy group, a propoxy group, a butoxy group, a methoxyethoxy group, and an ethoxyethoxy group.

The acyloxy group is preferably an aliphatic or aromatic acyloxy group represented by the formula: RCOO—, wherein R is an alkyl group having 1 to 10 carbon atoms or an aromatic group having 6 to 12 carbon atoms, and examples include an acetoxy group, a propionoxy group, a butyloxy group, and a benzoyloxy group.

The alkenyloxy group preferably has 3 to 10 carbon atoms and examples include an isopropenyloxy group, an isobutenyloxy group, and a 1-ethyl-2-methylvinyloxy group.

The iminoxy group (=N—OH, also referred to as an oxyimino group or a ketooxime group) preferably has around 3 to 10 carbon atoms and examples include a ketoxime group, a dimethylketoxime group, a methylethylketoxime group, a diethylketoxime group, a cyclopentanoxime group, a cyclohexanoxime group.

The amino group preferably has 1 to 10 carbon atoms and examples include an N-methylamino group, an N-ethylamino group, an N-propylamino group, an N-butylamino group, an N,N-dimethylamino group, an N,N-diethylamino group, a cyclohexylamino group.

The amide group preferably has 2 to 10 carbon atoms in total and include an N-methylacetamide group, an N-ethylacetamide group, an N-methylbenzamide group.

The aminooxy group preferably has 2 to 10 carbon atoms in total and examples include an N,N-dimethylaminooxy group, an N,N-diethylaminooxy group.

d is an integer of 0 to 2, preferably 0.

As the organosilane, commercial products are available. Examples of tetraethyl orthosilicate include "ethyl silicate 28" (manufactured by COLCOAT CO., LTD.) and "ethyl orthosilicate" (manufactured by TAMA CHEMICALS CO., LTD.), examples of the partial hydrolysate of tetraethyl orthosilicate include "silicate 40" (manufactured by TAMA CHEMICALS CO., LTD.) and "TES40 WN" (manufactured by Wacker Asahikasei Silicone Co., Ltd.), and examples of alkyltrialkoxysilane include "KBM-13" (manufactured by Shin-Etsu Chemical Co., Ltd.).

The organosilane and/or partial hydrolysis-condensate thereof can be used in an amount of 0.1 to 50 parts by weight, usually in an amount of 1 to 30 parts by weight, preferably in an amount of 3 to 15 parts by weight based on 100 parts by weight of the diorganopolysiloxane. Further, the weight of (b) the organosilane and/or partial hydrolysate thereof is preferably 1 to 20% by weight, more preferably 3 to 10% by weight, based on the total weight of the above diorganopolysiloxane (a) and the silica. This range can result in a curable organopolysiloxane antifouling composite coating film obtained by laminating an organopolysiloxane antifouling coating film excellent in both of antifouling performance and interlayer adhesiveness with a urethane resin coating film excellent in curability.

((c) Amino Group-Containing Alkoxysilane Represented by the Following General Formula (1) and/or Reaction Product Thereof)

The amino group-containing alkoxysilane represented by the following general formula (1) is an important compound that imparts the composition with adhesiveness.

$$X-R^1-SiR^2_n(OR^3)_{3-n} \quad (1)$$

wherein $R^1$ represents an alkylene group having 1 to 10 carbon atoms;

$R^2$ represents an alkyl group having 1 to 10 carbon atoms, an alkenyl group having 2 to 5 carbon atoms, or an aryl group having 6 to 12 carbon atoms;

$R^3$ represents an alkyl group having 1 to 10 carbon atoms;

X is a group represented by $R^4R^5N-$ or $R^6R^7C=N-$, wherein $R^4$ represents a hydrogen atom, an alkyl group having 1 to 10 carbon atoms, an alkenyl group having 2 to 5 carbon atoms, an aryl group having 6 to 12 carbon atoms, or $H_2N(CH_2)_p(NH(CH_2)_q)_r-$, p and q are integers of 2 to 5; and r is an integer of 0 to 5; $R^5$ represents a hydrogen atom, an alkyl group having 1 to 10 carbon atoms, an alkenyl group having 2 to 5 carbon atoms, or aryl group having 6 to 12 carbon atoms; and $R^6$ and $R^7$ each independently represent a hydrogen atom, an alkyl group having 1 to 10 carbon atoms, an alkenyl group having 2 to 5 carbon atoms, or an aryl group having 6 to 12 carbon atoms); and n is an integer of 0 to 2.

Examples of the compound include compounds having a γ-amino propyl group such as $NH_2C_3H_6Si(OCH_3)_3$, $NH_2C_3H_6Si(OC_2H_5)_3$, $NH_2C_3H_6Si(OC_3H_7)_3$, $NH_2C_3H_6Si(OC_4H_9)_3$, $NH_2C_3H_6Si(CH_3)(OCH_3)_2$, $NH_2C_3H_6Si(CH_3)(OC_2H_5)_2$, $NH_2C_3H_6Si(CH_3)(OC_3H_7)_2$, $NH_2C_3H_6Si(CH_3)(OC_4H_9)_2$, $NH_2C_3H_6Si(CH_3)_2(OCH_3)$, $NH_2C_3H_6Si(CH_3)_2(OC_2H_5)$, $NH_2C_3H_6Si(CH_3)_2(OC_3H_7)$, $NH_2C_3H_6Si(CH_3)_2(OC_4H_9)$ and compounds produced by an exchange reaction of some alkoxy groups with each other of $NH_2C_3H_6Si(OCH_3)(OC_2H_5)_2$ or $NH_2C_3H_6Si(OC_2H_5)_2(OC_3H_7)$;

compounds having an N-β-(aminoethyl)γ-aminopropyl group such as $NH_2C_2H_4NHC_3H_6Si(OCH_3)_3$, $NH_2C_2H_4NHC_3H_6Si(OC_2H_5)_3$, $NH_2C_2H_4NHC_3H_6Si(OC_3H_7)_3$, $NH_2C_2H_4NHC_3H_6Si(OC_4H_9)_3$, $NH_2C_2H_4NHC_3H_6Si(CH_3)(OCH_3)_2$, $NH_2C_2H_4NHC_3H_6Si(CH_3)(OC_2H_5)_2$, $NH_2C_2H_4NHC_3H_6Si(CH_3)(OC_3H_7)_2$, $NH_2C_2H_4NHC_3H_6Si(CH_3)(OC_4H_9)_2$, $NH_2C_2H_4NHC_3H_6Si(CH_3)_2(OCH_3)$, $NH_2C_2H_4NHC_3H_6Si(CH_3)_2(OC_2H_5)$, $NH_2C_2H_4NHC_3H_6Si(CH_3)_2(OC_3H_7)$, $NH_2C_2H_4NHC_3H_6Si(CH_3)_2(OC_4H_9)$;

compounds containing an N-(methyl)γ-aminopropyl group such as $N(CH_3)HC_3H_6Si(OCH_3)_3$, $N(CH_3)HC_3H_6Si(CH_3)(OCH_3)_2$, $N(CH_3)HC_3H_6Si(OC_2H_6)_3$ and $N(CH_3)HC_3H_6Si(CH_3)(OC_2H_5)_2$; $NH_2C_2H_4NHC_2H_4NHC_3H_6Si(OCH_3)_3$; $NH_2C_2H_4NHC_2H_4NHC_2H_4NHC_3H_6Si(OCH_3)_3$; $(CH_3)_3Si-NHC_3H_6Si(OCH_3)_3$; $(CH_3)_3Si-NHC_3H_6Si(CH_3)(OCH_3)_2$; and the like.

The amino group-containing alkoxysilane (c) is contained in an amount of preferably 0.001 to 5 parts by weight, more preferably 0.01 to 3 parts by weight based on 100 parts by weight of the solid contents of the curable polysiloxane composition (i.e., components excluding optional solvents). The amino group-containing alkoxysilane (c) in these range results in improved adhesiveness due to interaction with the isocyanate of the urethane resin coating film.

<Optional Components>

The curable polysiloxane composition in the present invention comprises the diorganopolysiloxane (a), the organosilane and/or a partial hydrolysis-condensate thereof (b), and the amino group-containing alkoxysilane and/or a reaction product thereof (c), and may also comprise, in addition to them, a catalyst (d), a silicone oil (e), a color pigment (f), an anti-sagging/anti-settling agent (g), a silane coupling agent (h), an additional filler (i), an additional coating film formation component (j), a thixotropy property-imparting agent (k) or the like.

(Catalyst (d))

As the catalyst (d), a curable catalyst can be preferably used and, for example, a catalyst described in Patent No. JP-B 2522854 can be used. Specific examples include tin carboxylates such as tin naphthenate and tin oleate; tin compounds such as dibutyltin diacetate, dibutyltin acetoacetonate, dibutyltin dioctoate, dibutyltin dilaurate, dibutyltin diolate, dibutyltin oxide, dibutyltin dimethoxide, dibutyltin dipentanoate, dibutyltin dioctoate, dibutyltin dineodecanoate, dioctyltin dineodecanoate, bis(dibutyltin laurate)oxide, dibutyl bis(triethoxysiloxy)tin, bis(dibutyltin acetate)oxide, dibutyltin bis(ethyl malate), and dioctyltin bis(ethyl malate); titanates or titanium chelate compounds such as tetraisopropoxy titanium, tetra n-butoxytitanium, tetrakis(2-ethylhexoxy)titanium, dipropoxybis(acetylacetonato)titanium, and titanium isopropoxyoctyl glycol; organometallic compounds such as zinc naphthenate, zinc stearate, zinc-2-ethyloctoate, iron-2-ethylhexoate, cobalt-2-ethylhexoate, manganese-2-ethylhexoate, cobalt naphthenate, and alkoxy aluminum compounds; aminoalkyl group-substituted alkoxysilanes such as 3-aminopropyltrimethoxysilane and N-β (aminoethyl)γ-aminopropyltrimethoxysilane; amine compounds such as hexylamine, dodecyldodecylamine phosphate, dimethylhydroxylamine, and diethylhydroxylamine, and salts thereof; quaternary ammonium salts such as benzyltriethylammonium acetate; lower fatty acid salts of alkali metals such as potassium acetate, sodium acetate, and lithium hydrobromide; and silanes or siloxanes containing a guanidyl group, such as tetramethylguanidylpropyltrimethoxysilane, tetramethylguanidylpropylmethyldimethoxysilane, and tetramethylguanidylpropyltris(trimethylsiloxy) silane.

Addition of the catalyst (d) can accelerate formation of a coating film, followed by forming a dry coating film more quickly.

The catalyst (d) is used in an amount of not more than 10 parts by weight, preferably not more than 5 parts by weight, further not more than 1 part by weight, based on 100 parts by weight of the diorganopolysiloxane (a), and a preferred lower limit in the case of using the catalyst is not less than 0.001 part by weight, particularly not less than 0.01 part by weight.

(Silicone Oil (e))

The silicone oil (e) is preferably a silicone oil with non-reactivity (non-condensation) or a silicone oil which bleeds out of a cured product of an antifouling paint. Examples of the silicone oil (e) include phenyl-modified organopolysiloxane, polyether-modified organopolysiloxane, and the like. Further, silicone oils (5) and (7) represented by the following formulae (5) and (7) and a silicone oil (6) having a group represented by the following formula (6) are preferred.

The silicone oils (5) and (7) are considered to exhibit neither reactivity with the above component (a) or the like nor self-condensation, and to be operative for forming an antifouling functional layer (film) on a coating film surface (layer). The silicone oil (6) is considered to react with, e.g., the component (a), which is a coating film formation component, to form a cured coating film, to be hydrolyzed over time by being dipped in sea water for a long term to have a terminal group having an alcoholic hydroxyl group "≡SiR$^4$OH", and to bleed out on a coating film surface to exert the effect of preventing the deposition of marine organisms.

$$(R^{10})_3SiO(SiR^{10}{}_2O)_nSi(R^{10})_3 \quad (5)$$

wherein plural groups of $R^{10}$ may be the same or different from each other and represent an alkyl group having 1 to 10 carbon atoms, aryl group, aralkyl group or fluoroalkyl group; and n represents an integer of 0 to 500.

$$\equiv SiR^{11}OSiR^{12}{}_bY \quad (6)$$

wherein $R^{11}$ represents an unsubstituted or substituted divalent hydrocarbon group or a divalent hydrocarbon group containing an ether bond; $R^{12}$ represents an unsubstituted or substituted monovalent hydrocarbon group; Y represents a hydroxyl group or a hydrolyzable group; and b is an integer of 0 to 2.

$$R^{13}{}_xSi(R^{14}-Z)_yO_{(4-x-y)/2} \quad (7)$$

wherein $R^{13}$ represents a hydrogen atom or an alkyl group having 1 to 10 carbon atoms, aryl group or aralkyl group; $R^{14}$ represents a divalent aliphatic hydrocarbon group having 1 to 10 carbon atoms which may have an ether group, an ester group, or —NH— therein; Z represents a monovalent polar group which is an amino group, a carboxyl group, an epoxy group, or a polyethylene glycol or polypropylene glycol group which may be end-capped with an alkyl group having 1 to 6 carbon atoms or an acyl group; and x and y satisfy $0.01 \leq x < 3.99$, $0.02 \leq y < 4$, and $0.02 \leq x+y < 4$.

The silicone oil represented by the above formula (5) may be silicone oils described in JP-A 10-316933, and preferably has a number average molecular weight of 180 to 20,000, preferably 1,000 to 10,000, and a viscosity of 20 to 30,000 mm$^2$/s, preferably 50 to 10,000 mm$^2$/s.

Examples of the silicone oils represented by the above formula (5) include dimethyl silicone oils in which all of $R^{10}$ are methyl groups; and phenyl methyl silicone oils in which some of the methyl groups of the dimethylsilicone oils are substituted by phenyl groups, and methyl phenyl silicone oils are preferred.

Examples of the methyl phenyl silicone oil include commercial products under trade names such as "KF-54, KF-56, KF-50" (products from Shin-Etsu Chemical Co., Ltd.), "SH510, SH550" (manufactured by Dow Corning Toray Silicone Co., Ltd.), and "TSF431, TSF433" (manufactured by Toshiba Silicone Co., Ltd.).

The silicone oil having the group represented by the above formula (6) may be silicone oils proposed by the present applicant and described in Japanese Patent No. 2522854, and preferably has a number average molecular weight of 250 to 20,000, preferably 1,000 to 10,000, and a viscosity of 20 to 30,000 mm$^2$/s, preferably 50 to 10,000 mm$^2$/s.

In the above formula (6), examples of $R^{11}$ include an unsubstituted or substituted divalent hydrocarbon group such as a methylene group, an ethylene group, a propylene group, a butylene group, and a hexamethylene group; a divalent hydrocarbon group containing an ether bond represented by "—(CH$_2$)$_p$—O—(CH$_2$)$_q$—", wherein p and q each independently represent an integer of 1 to 6, or the like. $R^{12}$ represents an unsubstituted or substituted monovalent hydrocarbon group having 1 to 8 carbon atoms; and Y is preferably at least one selected from the group consisting of a hydroxyl group, an iminoxy group, an amino group, an acetyloxy group and an alkoxy group.

Examples of the silicone oils having at least one group represented by the formula (6) include silicone oils, in which a hydroxyl group(s) of silicone oils represented by the following formula is capped with a hydrolyzable group(s): (CH$_3$)$_3$SiO[(CH$_3$)$_2$SiO]$_m$[R$^{15}$R$^{16}$SiO]$_n$(CH$_3$)$_2$SiC$_3$H$_6$—OH, HO—C$_3$H$_6$—[(CH$_3$)$_2$SiO][(CH$_3$)$_2$SiO]$_m$[R$^{15}$R$^{16}$SiO]$_n$—(CH$_3$)$_2$Si—C$_3$H$_6$—OH, (CH$_3$)$_3$SiO[(CH$_3$)$_2$SiO]$_m$[R$^{15}$R$^{16}$SiO]$_n$[(CH$_3$)(C$_3$H$_6$—OH)SiO]-$_l$[(CH$_3$)$_2$SiCH$_3$]. In each formula described above, at least one of $R^{15}$ and $R^{16}$ is an unsubstituted or substituted monovalent hydrocarbon group other than a methyl group selected from aryl groups such as a phenyl group and a tolyl group; aralkyl groups such as a benzyl group and a β-phenylethyl group; alkyl halide groups such as a trifluoropropyl group; and the like. The rest of the $R^{15}$ and $R^{16}$ is a methyl group. All of m, n, and l represent integers.

Further, silicone oils produced by reacting the above silicone oils with an organosilane represented by the above formula: "R$^8{}_d$SiY$_{4-d}$", wherein R$^8$, Y, and d are the same as those in the formula (2), as exemplified below are also preferred in view of the storage stability of an obtained composition.

Examples include (CH$_3$)$_3$SiO[(CH$_3$)$_2$SiO]$_m$[R$^{15}$R$^{16}$SiO]$_n$(CH$_3$)$_2$SiC$_3$H$_6$—O—R$^8{}_d$SiY$_{3-d}$, HO—C$_3$H$_6$—[(CH$_3$)$_2$SiO][(CH$_3$)$_2$SiO]$_m$[R$^{15}$R$^{16}$SiO]$_n$—(CH$_3$)$_2$Si—C$_3$H$_6$—O—R$^8{}_d$SiY$_{3-d}$, and (CH$_3$)$_3$SiO[(CH$_3$)$_2$SiO]$_m$[R$^{15}$R$^{16}$SiO]$_n$[(CH$_3$) (C$_3$H$_6$—O—R$^8{}_d$SiY$_{3-d}$)SiO]$_l$[(CH$_3$)$_2$SiCH$_3$].

Further, the silicone oil having the group represented by the above formula (7) may be, specifically, silicone oils described in JP-A 10-316933, and preferably has a number average molecular weight of 250 to 30,000, preferably 1,000 to 20,000, and a viscosity of 20 to 30,000 mm$^2$/s, preferably 50 to 10,000 mm$^2$/s.

Preferably, in the silicone oil represented by the above formula (7), $R^{13}$ is a methyl group or a phenyl group and $R^{14}$ is a methylene group, an ethylene group, or a propylene group. When Z is a polyethylene glycol or polypropylene glycol group which may be end-capped with an alkyl or acyl group having 6 or less carbon atoms, the number of oxyethylene or oxypropylene repeating units is preferably 10 to 60. Further, examples of the above alkyl group for end-capping include a methyl group, an ethyl group, a propyl group, a butyl group; and examples of the above acyl group for end-capping include a ketoxime group, an acetyl group, a propionyl group.

Specific examples of the silicone oil in which the polar group Z is an amino group include "SF8417" (manufactured by Dow Corning Toray Co., Ltd.), "ISI4700, ISI4701" (manufactured by Toshiba Silicone Co., Ltd.), and "FZ3712, AFL-40" (manufactured by NUC Corporation). Examples of the silicone oil in which the polar group Z is a carboxyl group include "X142-411" (manufactured by Toshiba Silicone Co., Ltd.), "SF8418" (manufactured by Dow Corning Toray Silicone Co., Ltd.), and "FXZ4707" (manufactured by NUC Corporation). Examples of the silicone oil in which the polar group is an epoxy group include "SF8411" (manufactured by in Dow Corning Toray Silicone Co., Ltd.), "XI42-301" (manufactured by Toshiba Silicone Co., Ltd.), and "L-93, T-29" (manufactured by NUC Corporation). Examples of the silicone oil in which the polar group Z is an alkyl group or an acyl group include "ISI4460, ISI4445, ISI4446" (manufactured by Toshiba Silicone Co., Ltd.), "SH3746, SH8400, SH3749, SH3700" (manufactured by Dow Corning Toray Silicone Co., Ltd.), and "KF6009" (manufactured by Shin-Etsu Silicone Co., Ltd.).

In the present invention, the silicone oil (e), preferably any one or two or more of the silicone oil (5), the silicone oil (6) and the silicone oil (7), is contained in an amount of preferably 0.1 to 200 parts by weight, more preferably 20 to 100 parts by weight, in total, based on 100 parts by weight of the above component (a).

The content of the silicone oil (e) in the above range results in a tendency to obtain an antifouling coating film excellent in both antifouling properties and coating film strength to form a good antifouling functional layer. The content of less than the above range may result in deteriorated antifouling properties, and the content of more than the above range may result in decreased coating film strength.

(Color Pigment (f))

As the color pigment (f), various organic and inorganic pigments known in the art can be used. Examples of the organic pigments include carbon black, phthalocyanine blue, and Prussian blue. Examples of the inorganic pigments include neutral and non-reactive inorganic pigments such as titanium white, bengala, black iron oxide red, baryta powder, silica, talc, whiting chalk, and brown iron oxide; and inorganic pigments (active pigments) that are basic and reactive with an acidic substance in a paint, such as zinc white (ZnO, zinc oxide), white lead, red lead, zinc powder, and lead suboxide power. In addition, various coloring agents such as dyes may also be contained.

The strength of a coating film can be improved by blending the color pigment (f), and further, a primer coating film can be prevented from deteriorating due to ultraviolet light by concealing the primer coating film.

The amount of the color pigment (f) is preferably 0.01 to 30 parts by weight based on 100 parts by weight of the diorganopolysiloxane (a).

Further, the amount of the color pigment (f) is preferably 0.01 to 30% by weight, more preferably 0.1 to 20% by weight, based on the total amount of the diorganopolysiloxane (a) and the silica.

(Anti-Sagging/Anti-Settling Agent (Thixotropic Agent) (g))

Examples of the anti-sagging/anti-settling agent (thixotropic agent) (g) include a glycidyl-modified organopolysiloxane, a polyether-modified organopolysiloxane, salts such as stearate salts, lecithin salts and alkylsulfonate salts of Al, Ca, Zn, or Na of organoclays, a polyethylene wax, an amide wax, a substance based on a hydrogenated castor oil wax, a substance based on a polyamide wax and a mixture of both, pulverized synthetic silica, an oxidized polyethylene wax, and preferably include a polyamide wax, a pulverized synthetic silica, and an oxidized polyethylene wax. Examples of the anti-sagging/anti-settling agents include commercial products under trade names such as "DISPARLON 305", "DISPARLON 4200-20", and "DISPARLON A630-20X", manufactured by Kusumoto Chemicals, Ltd.

The anti-sagging properties of a coating film can be improved by blending the anti-sagging/anti-settling agent (g). However, since the increase of the blending amount thereof also causes deterioration of coating atomization properties and deterioration of the leveling properties of a coating film, the amount of the anti-sagging/anti-settling agent (F) is preferably 0.1 to 20 parts by weight based on 100 parts by weight of the diorganopolysiloxane (a).

(Silane Coupling Agent (h))

The silane coupling agent (h) is substances such as silane coupling agents containing one or two or more groups such as an alkoxysilyl group, an epoxy group, a hydrosilyl group and a (meth)acrylic group or mixtures of the substances, and examples include 3-(2-aminoethyl)aminopropyltrimethoxysilane, 3-aminopropyltrimethoxysilane, 3-aminopropyltriethoxysilane, 3-(2-(2-aminoethyl)aminoethyl)aminopropyltrimethoxysilane, 3-glycidoxypropylmethyldimethoxysilane, vinyltrimethoxysilane, vinyltriethoxysilane, 3-mercaptopropyltrimethoxysilane, N-phenylpropyltrimethoxysilane, and N-phenylpropyltriethoxysilane.

Adhesion between a primer coating film and a substrate can be more strengthened by blending the silane coupling agent (h).

The amount of the silane coupling agent (h) is preferably 0.01 to 10 parts by weight based on 100 parts by weight of the diorganopolysiloxane (a).

(Additional Filler (i))

Examples of additional fillers include metal oxides such as diatomaceous earth, alumina and mica or substances prepared by surface-treating the surfaces thereof with a silane compound; metal carbonates such as calcium carbonate, magnesium carbonate and zinc carbonate; asbestos, glass fibers, quartz powders, aluminum hydroxide, gold powders, silver powders, surface-treated calcium carbonate, glass balloons, and barium sulfate. The fillers may be used singly or in combination of two or more.

(Additional Coating Film Formation Component (j))

Additional coating film formation components (j) may include coating film formation components other than the organopolysiloxane (a) and the like without departing from an object of the present invention. Examples of the "additional coating film formation components" include poorly water-soluble or water-insoluble resins (hereinafter also referred to as poorly water-soluble/water-insoluble resins) such as acrylic resin, acrylic silicone resin, unsaturated polyester resin, fluorine resin, polybutene resin, silicone rubber, urethane resin (rubber), polyamide resin, vinyl chloride copolymer resin, chlorinated rubber (resin), chlorinated olefin resin, styrene-butadiene copolymer resin, ethylene-vinyl acetate copolymer resin, vinyl chloride resin, alkyd resin, cumarone resin, trialkylsilyl acrylate (co)polymer (silyl resin), and petroleum resin.

The strength of a formed coating film can be improved by blending the additional coating film formation component (j).

The amount of the additional coating film formation component (j) is preferably 0.01 to 10 parts by weight based on 100 parts by weight of the diorganopolysiloxane (a).

(Thixotropy-Imparting Agent (k))

Examples of the thixotropy-imparting agent include polyethylene glycol, polypropylene glycol and derivatives thereof.

The curable polysiloxane composition used in the present invention is usually provided as a multi-component paint comprising two or more liquids. Each of these liquids is separately stored and kept in the state of being put in a container such as a can and the liquids are mixed and stirred to be used for coating.

In a three-component antifouling paint composition, a main agent (X), a curing agent (Y), and an adhesiveness-imparting component (Z) are each separately packaged (packed) and are mixed for use.

The main agent (X) preferably contains a heat-treated product (a22) formed by subjecting the diorganopolysiloxane (a) having at least two functional groups (condensation reactive groups) in one molecule and silica to heat treatment; or the heat-treated product (a22) and the diorganopolysiloxane (a) having at least two functional groups (condensation reactive groups) in one molecule.

The main agent (X) may further contain a color pigment (f) such as titanium white, black iron oxide red, carbon black, iron oxide red, or cobalt blue.

The main agent (X) may optionally contain a solvent. As the solvent, e.g., an aliphatic, aromatic, ketone-based, ester-based, ether-based, or alcohol-based solvent known in the art can be used. Examples of the aromatic solvent include xylene, and toluene; examples of the ketone-based solvent include MIBK, cyclohexanone; examples of the ether-based solvent include propylene glycol monomethyl ether, and propylene glycol monomethyl ether acetate (PGMAC); and examples of the alcohol-based solvent include isopropyl alcohol.

It is preferable to use, e.g., 0 to 50% by weight of the solvent based on the diorganopolysiloxane so that the viscosity of an obtained antifouling paint composition is suitable in view of coating properties. In addition, the curing agent (Y) and the adhesiveness-imparting component (Z), which are blended with an appropriate amount of such a solvent, may also be used.

The curing agent (Y) contains the organosilane having two or more hydroxyl or hydrolyzable groups in one molecule and/or a partial hydrolysis-condensate thereof (b); and an optional component that is unsuitable for storage because of having high reactivity with the main agent (X).

A single antifouling coating film can also be formed from the curable polysiloxane composition used for forming the antifouling coating film in the present invention.

Such an antifouling coating film and the antifouling composite coating film of the present invention as described above can be formed to cover the substrate of an underwater structure, a ship, and is capable of exerting good antifouling performance.

The adhesiveness imparting component (Z) comprises an optional component having high reactivity with the main agent (X) and the curing agent (Y) and therefore having possibility to be unsuitable for storage with them.

The optional component is specifically an amino group-containing alkoxysilane.

The expression "laminated in order of (I) and (II) from a surface of a substrate" means formation of the composite film in order of substrate/urethane resin anticorrosive coating film (I)/antifouling coating film (II).

Since such an antifouling structure has excellent interlayer adhesive strength between the substrate and the urethane resin anticorrosive coating film (I) and between the urethane resin anticorrosive coating film (I) and the antifouling coating film (II) and it is not necessary to dispose primer layers or binder layers between the respective coating films (layers), coating work can be completed in a short period. Moreover, even when such an antifouling structure is brought into contact with fresh water or sea water, biofouling of the contact surface thereof is prevented.

Since the paint for the urethane resin anticorrosive coating film (I) used for producing such an antifouling structure is cured in an extremely short time, the paint for the antifouling coating film (II) can be directly applied immediately after the formation of the urethane resin anticorrosive coating film (I). Therefore, a coating step is shortened and coating days are shortened.

A method known in the art, such as brush coating, spray coating (air spray, airless spray), roll coater coating, and dipping a substrate to be coated, on which a urethane resin anticorrosive coating film is formed, in a top coating paint, may be appropriately adopted to form the antifouling coating film formed from the curable polysiloxane composition on the urethane resin anticorrosive coating film.

Substrate

Examples of the substrate include structures placed in sea, such as cooling water inlets and outlets for thermal/atomic power plants or seaside plants, harbor facilities, undersea pipelines, undersea oil field drilling rigs, sea route buoys, and buoys for mooring ships, and structures placed in fresh water. The shape of the substrate to be coated is a plate, a pipe, a half pipe, a sphere, and the like, without particular limitation, as long as coating by such a method as described below is possible.

Examples of the material of the substrate include metals, concretes, resins, woods, organic fiberboards, and papers. More specific examples of the metals include carbon steel, aluminum, stainless steel, copper, copper alloy, and galvanized steel, zinc.

Specific examples of the resins include hard materials such as methyl methacrylate, polycarbonate, FRP (glass fiber reinforced plastic) and CRP (carbon fiber reinforced plastic), vinyl chloride, polyolefin, and vinylidene chloride. These plastic materials may be foams or non-foams. Of the various resin materials, carbon steel and concrete are preferred in view of, for example, interlayer peel strength between the substrate and the urethane resin anticorrosive coating film.

It is preferable to subject the surface of the substrate to base treatment beforehand by such a method as described below prior to application of a urethane resin anticorrosive paint. That is, when the substrate is carbon steel, in the base pretreatment of the above surface of the substrate, mill scale, rust, or the like is removed by a blast, a disc sander, a power brush, or the like, followed by optionally removing a contaminant adhering to the surface of the substrate with an organic solvent-soaked cloth. In the case of a material such as aluminum, stainless steel, or copper alloy, the surface of the substrate is slightly roughened by a power brush, sandpaper, followed by optionally wiping fouling off with an organic solvent-soaked cloth to clean the surface of the substrate.

When the substrate is a concrete, efflorescence, laitance, adhering to the surface of the substrate is elaborately removed by a disc sander, a power brush, followed by performing clear water washing to clean the surface of the substrate and further removing adsorption moisture by natural drying or hot-air drying so that surface moisture is not more than 10% by weight.

When the substrate is a resin, the surface of the substrate is roughened by performing surface roughening by an abrasive material such as sandpaper, followed by wiping off fouling on the surface of the substrate with a cloth soaked with an organic solvent such as lacquer thinner to clean the surface of the substrate.

Method for Forming Antifouling Coating Film and Antifouling Composite Coating Film The antifouling composite coating film of the present invention is produced by forming the urethane resin anticorrosive coating film (I) on the surface of the substrate and then coating the antifouling paint composition to form the antifouling coating film (II).

In consideration of long-term anticorrosion properties, an epoxy resin anticorrosive paint can also be applied to the lower layer of the urethane resin anticorrosive coating film.

The urethane resin anticorrosive coating film, which is a base for the antifouling coating film in the present invention, is formed according to a common technique, i.e., by having the anticorrosive paint composition be stirred and mixed, then applied or impregnated on the surface of the substrate, and cured in atmospheric air for around 0.5 to 3 days. The cured anticorrosive coating film [I] may have a desired thickness depending on the intended use. For example, the urethane resin anticorrosive paint composition is applied or impregnated one to several times at 30 to 150 µm/time and then cured so that the thickness of the dried film is 50 to 5000 µm, to obtain a coating having excellent anticorrosion properties.

Further, an epoxy coating film is formed to have a thickness of 100 to 300 µm on a lower layer and the urethane paint of the present technology is formed to have a thickness of 30-200 µm thereon to obtain a coating excellent in long-term anticorrosion properties and economical efficiency.

The urethane resin anticorrosive coating film [I] well adheres to the surface of the substrate even when the material of the substrate is FRP, steel, wood, aluminum alloy, or the like, and, especially, steel is preferred as the material in view of adhesiveness. The substrate may also be subjected to known surface treatment such as blast treatment in order to enhance adhesiveness with the anticorrosive coating film [I].

On the other hand, the above antifouling coating film [II] is formed according to a common technique, i.e., by stirring and mixing the above-mentioned antifouling paint composition, then coating the surface of the above anticorrosive coating film [I] therewith, and leaving it standing in atmospheric air at ordinary temperature for around 0.5 to 3 days or forcibly sending air under heating to cure it. The cured anticorrosive coating film [II] may have a desired thickness depending on the intended use. For example, the antifouling paint composition is applied or impregnated one to several times at 30 to 150 µm/time and then cured so that the film thickness is 50 to 5000 µm, to obtain a coating excellent in antifouling performance and adhesiveness with the urethane resin anticorrosive coating film [I].

The anticorrosive coating film [I] on which the antifouling coating film [II] is to be formed may be completely cured. Or, the antifouling paint composition may also be applied on the anticorrosive coating film [I] in a semi-cured-to-touch state to form the antifouling coating film [II] in view of improvement in adhesiveness.

The antifouling paint composition of the present invention is obtained, for example, by sequentially or simultaneously adding the ingredients of packs of a multi-component paint, which are respective components that constitute an antifouling paint, and an optional component as needed and mixing them according to a usual method.

The antifouling composite coating film of the present invention can be used as a coating material (coating composition) for coating surfaces of various substrates such as electrical components, electronic components, building materials and craft articles, and for protecting surfaces of various substrates such as substrates in contact with sea water or fresh water, such as ships and fishery materials (e.g., ropes, fishing nets, fishing implements, floats, buoys, etc.), underwater structures such as the supply and exhaust ports of thermal/atomic power plants, and sludge scattering prevention films for various ocean civil engineering works for bayshore roads, undersea tunnels, harbor facilities, canals, water passages, and the like.

As described above, the antifouling composite coating film of the present invention is used in a wide variety of industrial fields such as electrical/electronic fields, building/craft fields, agriculture, forestry and fisheries, electricity generation, harbor/engineering works, and shipbuilding or ship repairing, particularly ship coating.

EXAMPLES

The present invention is further specifically explained with reference to examples below. The present invention is not limited to the description of the examples below unless deviating from the gist of the present invention.

(Preparation of Curable Organopolysiloxane Antifouling Paint Composition)

Three-component curable organopolysiloxane compositions comprising a main agent (X), a curing agent (Y), and an adhesiveness-imparting component (Z) having a formulation described in Table 1 were prepared. The adhesiveness-imparting component (Z) was prepared by using any one of six kinds of an aminosilane compounds.

77 parts by weight of the main agent (X), 18 parts by weight of the curing agent (Y), and 5 parts by weight of the adhesiveness-imparting component (Z), listed in Table 1, were sufficiently mixed using a disperser to be homogeneous and to prepare an antifouling paint composition for any of Examples 1, 2, and 12 to 15, comprising components in amounts listed in Table 4.

77 parts by weight of the main agent (X), 18 parts by weight of the curing agent (Y), and 3.3 parts by weight of the adhesiveness-imparting component (Z) were sufficiently mixed using the disperser to be homogeneous and to prepare an antifouling paint composition for any of Examples 3 to 5, 8 to 11, and 16 to 18 and Comparative Example 2, comprising components in amounts listed in Table 4.

77 parts by weight of the main agent (X), 18 parts by weight of the curing agent (Y), and 1.7 parts by weight of the adhesiveness-imparting component (Z) were sufficiently mixed using the disperser to be homogeneous and to prepare an antifouling paint composition for Example 6, comprising components in amounts listed in Table 4.

77 parts by weight of the main agent (X), 18 parts by weight of the curing agent (Y), and 0.6 part by weight of the adhesiveness-imparting component (Z) were sufficiently mixed using the disperser to be homogeneous and to prepare an antifouling paint composition for Example 7, comprising components in amounts listed in Table 4.

An antifouling paint composition for Comparative Example 1, comprising only 77 parts by weight of the main agent (X) and 18 parts by weight of the curing agent (Y) was prepared.

TABLE 1

| Pack | Component | General name, chemical formula, etc. | Blending amount (part by weight) | Manufacturer | Trade name |
|---|---|---|---|---|---|
| Main agent (X) | Diorganopolysiloxane | HO—[Si(CH$_3$)$_2$—O—]$n$—H *1 | 70 | | |
| | Silica | Hydrophobic silica subjected to surface treatment with hexamethyldisilazane | | | |
| | Color pigment | Titanium white | 10 | Sakai Chemical Industry Co., Ltd. | R-5N |
| | | Carbon black | 0.1 | Mitsubishi Chemical Corporation | MA-100 |
| | Solvent | Xylene | 19.9 | | |
| | | Total | 100 | | |
| Curing agent (Y) | Organosilane partial hydrolysate | H$_5$C$_2$O—[Si(OC$_2$H$_5$)$_2$—O—]$_n$—C$_2$H$_5$ | 15 | Wacker Asahikasei Silicone Co., Ltd. | TES40 WN |
| | Organopolysiloxane *2 | H$_3$C—[SiR$^a_2$—O—]$_n$—CH$_3$ *3 H$_3$C—[SiR$^a_2$—O—]$_n$—CH$_3$ *4 | 35 | | |
| | Tin compound | Dibutyltin dilaurate | 3 | | |
| | Solvent | Xylene | 47 | | |
| | | Total | 100 | | |
| Adhesiveness-imparting component (Z) | Amino compound *5 | N-2(Aminoethyl)3-aminopropyltrimethoxysilane N-2(Aminoethyl)3-aminopropyltriethoxysilane N-2(Aminoethyl)3-aminopropylmethyldimethoxysilane 3-Aminopropyltrimethoxysilane (3-Trimethoxysilylpropyl)diethylenetriamine (3-Trimethoxysilylpropyl)triethylenetetramine | 5 | | |
| | Solvent | Xylene | 95 | | |
| | | Total | 100 | | |

*1: Diorganopolysiloxane. Viscosity: about 3000 mPa · s
*2: Either *3 or *4 was used in Examples 1-15 and Comparative Examples 1-2.
*3: Dimethyldiphenyl silicone oil (methyl group: about 95%, phenyl group: about 5%). Viscosity: about 100 mPa · s. R$^a$ represents a methyl group or a phenyl group.
*4: Dimethyldiphenyl silicone oil (methyl group: about 95%, phenyl group: about 5%). Viscosity: about 1000 mPa · s. R$^a$ represents a methyl group or a phenyl group.
*5: Any one of the amino compounds in the present invention was used in Examples 1-15 and Comparative Examples 1-2.

(Preparation of Urethane Resin Paint Composition)

A main agent (X) and a curing agent (Y) having formulations shown in Table 2 for a urethane resin paint composition were prepared. Then, 81 parts by weight of the main agent (X) and 19 parts by weight of the curing agent (Y) were sufficiently mixed with a stirrer to be homogeneous and to prepare a paint composition for forming a urethane resin anticorrosive coating film.

TABLE 2

| Pack | Component | General name | Paint composition (part by weight) | | | | | | | | Manufacturer |
|---|---|---|---|---|---|---|---|---|---|---|---|
| | | | AC-1 | AC-2 | AC-3 | AC-4 | AC-5 | AC-6 | AC-7 | | |
| Main agent (X) | 1) Resin | Polyester polyol | 18.0 | 18.0 | 18.0 | 18.0 | 18.0 | 18.0 | 18.0 | PHTHALKYD 806 | Hitachi Chemical Company, Ltd. |
| | | Petroleum resin | 10.0 | 10.0 | 10.0 | 10.0 | 10.0 | 10.0 | 10.0 | NEOPOLYMER E-100 | Nippon Oil Corporation |
| | 2) Filling pigment | Talc | 16.0 | 16.0 | 16.0 | 16.0 | 16.0 | 16.0 | 16.0 | TTK TALC | Takehara Kagaku Kogyo Co., Ltd. |
| | | Calcined plaster | 6.0 | 6.0 | 6.0 | 6.0 | 6.0 | 6.0 | 6.0 | CALCINED PLASTER FT-2 | NORITAKE CO., LIMITED |
| | | Potassium feldspar | 6.0 | 6.0 | 6.0 | 6.0 | 6.0 | 6.0 | 6.0 | UNIPAR PG-K10 | Sibelco |

TABLE 2-continued

| Pack | | Component | General name | Paint composition (part by weight) | | | | | | | | Manufacturer |
|---|---|---|---|---|---|---|---|---|---|---|---|---|
| | | | | AC-1 | AC-2 | AC-3 | AC-4 | AC-5 | AC-6 | AC-7 | | |
| | 3) | Color pigment | Titanium oxide | 6.0 | 6.0 | 6.0 | 6.0 | 6.0 | 6.0 | 6.0 | TITONE R-5N | Sakai Chemical Industry Co., Ltd. |
| | | | Carbon black | 0.1 | 0.1 | 0.1 | 0.1 | 0.1 | 0.1 | 0.1 | CARBON BLACK MA-100 | Mitsubishi Chemical Corporation |
| | 4) | Dehydrating agent | Molecular sieve | 1.0 | 1.0 | 1.0 | 1.0 | 1.0 | 1.0 | 1.0 | MOLECULAR SIEVE 4A | UNION SHOWA K.K. |
| | 5) | Anti-sagging agent | Polyamide wax | 2.0 | 2.0 | 2.0 | 2.0 | 2.0 | 2.0 | 2.0 | DISPARLON 6650 | Kusumoto Chemicals, Ltd. |
| | 6) | Catalyst | Tin compound | 0.1 | 0.1 | 0.1 | 0.1 | 0.1 | 0.1 | 0.1 | NEOSTANN U-100 | Nitto Kasei Co., Ltd. |
| | 7) | Catalyst | Tertiary amine compound | 0.10 | 0.05 | 0.00 | | | | 0.15 | 1,2-Dimethyl imidazole | |
| | | | | | | | 0.10 | | | | U-CAT SA1 *1) | San-Apro, Ltd. |
| | | | | | | | | 0.10 | | | U-CAT SA-102-50 *2) | San-Apro, Ltd. |
| | | | | | | | | | 0.10 | | U-CAT 1102 *3) | San-Apro, Ltd. |
| | 8) | Solvent | | 6.70 | 6.75 | 6.80 | 6.70 | 6.70 | 6.70 | 6.65 | Xylene | |
| | | | | 3.0 | 3.0 | 3.0 | 3.0 | 3.0 | 3.0 | 3.0 | Ethyl Acetate | |
| | | | | 6.00 | 6.00 | 6.00 | 6.00 | 6.00 | 6.00 | 6.00 | MIBK | |
| | | Total | | 81.00 | 81.00 | 81.00 | 81.00 | 81.00 | 81.00 | 81.00 | | |
| Curing agent (Y) | 1) | Isocyanate | TDI-based isocyanate | 15.0 | 15.0 | 15.0 | 15.0 | 15.0 | 15.0 | 15.0 | CORONATE L-75 | Nippon Polyurethane Industry Co., Ltd. |
| | 2) | Solvent | | 3.0 | 3.0 | 3.0 | 3.0 | 3.0 | 3.0 | 3.0 | Ethyl Acetate | |
| | | | | 1.0 | 1.0 | 1.0 | 1.0 | 1.0 | 1.0 | 1.0 | Xylene | |
| | | Total | | 19.0 | 19.0 | 19.0 | 19.0 | 19.0 | 19.0 | 19.0 | | |
| | | Total | | 100.0 | 100.0 | 100.0 | 100.0 | 100.0 | 100.0 | 100.0 | | |

*1) main component: 1,8-diazabicyclo(5,4,0)-undecen-7-octylate
*2) main component: 1,8-diazabicyclo(5,4,0)-undecen-7-octylate solution]
*3) main component: 1,5-diazabicyclo(4,3,0)-nonen-5-octylate (Preparation of Epoxy Resin Paint Composition)

A main agent (X) and a curing agent (Y) having formulations as shown in Table 3 for an epoxy resin paint composition were prepared. Then, 85 parts by weight of the above main agent (X) and 15 parts by weight of the curing agent (Y) were sufficiently mixed with a stirrer to be homogeneous and to prepare a paint composition for forming an epoxy resin anticorrosive coating film.

(Tensile Test)

A urethane resin anticorrosive coating film of any one of urethane resin anticorrosive paints AC-1 to AC-7, the film having a dry film thickness of 400 μm, was formed on a sandblast steel plate of 100 mm×300 mm×2.3 mm at ordinary temperature (23° C.). Then, the anticorrosive coating film dried for 6 hours was coated with the antifouling paint composition prepared in any of Examples 1 to 15 and

TABLE 3

| Pack | Component | General name | AC-8 (part by weight) | Trade name | Manufacturer |
|---|---|---|---|---|---|
| Main agent (X) | Epoxy resin | Bisphenol A type epoxy resin | 30 | EPIKOTE 1001 | Japan Epoxy Resins Co., Ltd. |
| | Filler | Talc | 25 | Talc F-2 | FUJI TALC INDUSTRIAL CO., LTD. |
| | | Barium sulfate | 10 | Barium sulfate BA | Sakai Chemical Industry Co., Ltd. |
| | Anti-sagging agent | Polyamide wax | 2 | DISPARLON 6650 | Kusumoto Chemicals, Ltd. |
| | Solvent | Xylene | 9 | | |
| | | Methyl isobutyl ketone | 9 | | |
| | | Total | 85 | | |
| Curing agent (Y) | Amine curing agent | Polyamideamine | 10 | LUCKAMIDE TD966 | Dainippon Ink And Chemicals, Inc. |
| | Solvent | Xylene | 2 | | |
| | | n-Butanol | 3 | | |
| | | Total | 15 | | |

[Evaluation Method]

The antifouling composite coating films formed from the urethane resin paint compositions and the curable organopolysiloxane paint compositions prepared as mentioned above were subjected to a tensile test, a tape peel test, a fresh water dipping test, and an antifouling test by methods described below. The test results are listed in Table 4.

Comparative Example 1 to have a dry film thicknesses of 300 μm using a spray coater (trade name: iwata WIDER SPRAY GUN, model number: W-77-2G) under ordinary temperature and was dried for 1 day.

The tensile test was conducted by a method specified in JIS K 5600-5-7 (ISO 4624). A test cylinder (Dolly piece) made of stainless steel having a cross-sectional area of 2 cm² was adhered to each of the test plates having the cured antifouling composite coating films using an adhesive agent (trade name "TSE399", manufactured by GE TOSHIBA SILICONES CO., LTD.). Slits were made on the periphery of this Dolly piece with a retractable knife, followed by measuring adhesive strength with a pull-off tester (PULL GAUGE/model number: 200, manufactured by Fujimoto Co., Ltd.).

(Tape Peel Test 1)

A masking tape (trade name "MASKING TAPE FOR CONSTRUCTION" (manufactured by Nichiban Co., Ltd.)) was pasted on the center of a sandblast steel plate of 100 mm×300 mm×2.3 mm, which was coated with the urethane resin paint composition under an ordinary temperature (23° C.) condition using a spray coater (trade name: iwata WIDER SPRAY GUN, model number: W-77-2G) and dried for 6 hours to form a urethane resin anticorrosive coating film having a dry film thickness of 250 μm. Then, the dried anticorrosive coating film was coated with the antifouling paint composition prepared in any of Examples 1 to 15 and Comparative Example 1 to have a dry film thickness of 300 μm under ordinary temperature using a spray coater (trade name: iwata WIDER SPRAY GUN, model number: W-77-2G) and was dried for 1 day.

The pasted masking tape was removed to form a step (difference in level) on the coating film, followed by strongly rubbing the coating film at the step portion with the ball of a finger and by measuring a size of a peeled portion of the coating film. The size was represented by "maximum peeling distance", which is a maximum distance from an area on the sandblast steel plate where the masking tape was pasted to an end of the peeled portion. Sufficient adhesion results in the maximum peeling distance of 0 mm, while poor adhesion results in the longer distance.

(Fresh Water Dipping Test 1)

An epoxy resin paint composition was applied on a sandblast steel plate of 100 mm×300 mm×2.3 mm at ordinary temperature (23° C.) using a spray coater (trade name: iwata WIDER SPRAY GUN, model number: W-77-2G) to have a thickness of 150 μm. In this case, BANNOH 500 [epoxy anticorrosive paint manufactured by Chugoku Marine Paints, Ltd.] as the epoxy resin paint composition was used and dried for 1 day to form an epoxy resin coating film, and the urethane resin paint composition was applied on the epoxy resin coating film using a spray coater (trade name: iwata WIDER SPRAY GUN, model number: W-77-2G) at ordinary temperature (23° C.) to have a thickness of 100 μm and dried for 6 hours. Then, the obtained anticorrosive coating film was coated with the antifouling paint composition prepared for any of Examples 1 to 15 and Comparative Example 1 at ordinary temperature using a spray coater (trade name: iwata WIDER SPRAY GUN, model number: W-77-2G) to have a dry film thickness of 300 μm and was dried for 1 day.

The cured composite coating film was dipped in deionized water, which was kept at 23° C., for 6 months. The degree of a generated blister was evaluated by the method specified in ASTM D714. The size and density of a blister according to ASTM D714 were judged on criteria listed in Table 6. For example, a case in which blisters with a size of 8 (significantly small blisters) were moderately distributed was represented by 8M.

(Antifouling Test)

The urethane resin paint composition was applied on a sandblast steel plate of 100 mm×300 mm×2.3 mm at ordinary temperature (23° C.) using a spray coater (trade name: iwata WIDER SPRAY GUN, model number: W-77-2G) and was dried for 6 hours to form a urethane resin anticorrosive coating film having a dry film thickness of 250 μm. Then, the dried anticorrosive coating film was coated with the antifouling paint composition prepared for any of Examples 1 to 15 and Comparative Example 1 to have a dry film thickness of 300 μm under ordinary temperature using a spray coater (trade name: iwata WIDER SPRAY GUN, model number: W-77-2G) and was dried for 1 day. As a result, the coating film did not adhere in the case of using the antifouling paint composition for Comparative Example 1 and the antifouling test was therefore conducted only in the case of using the antifouling paint compositions for Examples 1 to 15 in which the cured antifouling composite coating films were formed.

The test plate having the cured antifouling composite coating film was left standing and dipped in sea water in Nagasaki Bay, Nagasaki Prefecture, for 12 months, visually observed at six months later and 12 months later, and subjected to evaluation of antifouling properties on the criteria described below.

Criteria of evaluation of antifouling properties 5 points: Deposition of extremely thin slime is observed, but no deposition of animal species is observed.

4 points: Deposition of slime is observed, but no deposition of animal species is observed.

3 points: Deposition of heavy slime is observed, but no deposition of animal species is observed.

2 points: Fouling by animal species is observed.

1 point: Deposition of animal species is observed over the whole coating film.

TABLE 4

| | | | Example 1 | Example 2 | Example 3 | Example 4 | Example 5 | Example 6 |
|---|---|---|---|---|---|---|---|---|
| Top coating formulation (part by weight, only solid content) | Main Agent (X) | Diorganopolysiloxane and silica | 75.4 | 75.4 | 75.5 | 75.5 | 75.5 | 75.6 |
| | | Titanium white and carbon black | 10.8 | 10.8 | 10.8 | 10.8 | 10.8 | 10.8 |
| | Curing agent (Y) | Organosilane partial hydrolysate | 3.8 | 3.8 | 3.8 | 3.8 | 3.8 | 3.8 |
| | | Organopolysiloxane *1 | 8.9 | | 8.9 | 8.9 | 8.9 | |
| | | Organopolysiloxane *2 | | 8.9 | | | | 8.9 |
| | | Dibutyltin dilaurate | 0.8 | 0.8 | 0.8 | 0.8 | 0.8 | 0.8 |

TABLE 4-continued

|  |  |  | | | | | | |
|---|---|---|---|---|---|---|---|---|
| Adhesiveness - imparting component (Z) | N-2(Aminoethyl)3-aminopropyltrimethoxysilane | | 0.3 | | 0.2 | 0.2 | 0.2 | |
| | N-2(Aminoethyl)3-aminopropyltriethoxysilane | | | 0.3 | | | | 0.1 |
| | N-2(Aminoethyl)3-aminopropylmethyldimethoxysilane | | | | | | | |
| | 3-Aminopropyltrimethoxysilane | | | | | | | |
| | (3-Trimethoxysilylpropyl)diethylenetriamine | | | | | | | |
| | (3-Trimethoxysilylpropyl)triethylenetetramine | | | | | | | |
| | Total | | 100.0 | 100.0 | 100.0 | 100.0 | 100.0 | 100.0 |
| Under coating | | | AC-1 | AC-1 | AC-1 | AC-2 | AC-7 | AC-1 Urethane paint |
| Test results | Adhesiveness | Tensile test (Mpa) | 2.3 | 2.3 | 2.4 | 2.4 | 2.4 | 2.2 |
| | | Tape peel test | 0 mm | 0 mm | 0 mm | 0 mm | 0 mm | 0 mm |
| | | Fresh water dipping test, 6 months later | None | None | None | None | None | None |
| | Antifouling properties | 6 months | 5 | 5 | 5 | 5 | 5 | 5 |
| | | 12 months | 5 | 5 | 5 | 5 | 5 | 5 |

|  |  |  | Example 7 | Example 8 | Example 9 | Example 10 | Example 11 | Example 12 |
|---|---|---|---|---|---|---|---|---|
| Top coating formulation (part by weight, only solid content) | Main Agent (X) | Diorganopolysiloxane and silica | 75.66 | 75.5 | 75.5 | 75.5 | 75.4 | 75.5 |
| | | Titanium white and carbon black | 10.8 | 10.8 | 10.8 | 10.8 | 10.8 | 10.8 |
| | Curing agent (Y) | Organosilane partial hydrolysate | 3.8 | 3.8 | 3.8 | 3.8 | 3.8 | 3.8 |
| | | Organopolysiloxane *1 | 6 | 8.9 | 8.9 | 8.9 | | 6 |
| | | Organopolysiloxane *2 | 2.9 | | | | 8.9 | 2.9 |
| | | Dibutyltin dilaurate | 0.8 | 0.8 | 0.8 | 0.8 | 0.8 | 0.8 |
| Adhesiveness - imparting component (Z) | N-2(Aminoethyl)3-aminopropyltrimethoxysilane | | 0.04 | 0.2 | 0.2 | 0.2 | | 0.2 |
| | N-2(Aminoethyl)3-aminopropyltriethoxysilane | | | | | | | |
| | N-2(Aminoethyl)3-aminopropylmethyldimethoxysilane | | | | | | 0.3 | |
| | 3-Aminopropyltrimethoxysilane | | | | | | | |
| | (3-Trimethoxysilylpropyl)diethylenetriamine | | | | | | | |
| | (3-Trimethoxysilylpropyl)triethylenetetramine | | | | | | | |
| | Total | | 100.0 | 100.0 | 100.0 | 100.0 | 100.0 | 100.0 |
| Under coating | | | AC-1 | AC-3 | AC-4 | AC-5 | AC-6 | AC-1 Urethane paint |
| Test results | Adhesiveness | Tensile test (Mpa) | 2.1 | 2.2 | 2.4 | 2.2 | 2.2 | 2 |
| | | Tape peel test | 0 mm | 0 mm | 0 mm | 0 mm | 0 mm | 0 mm |
| | | Fresh water dipping test, 6 months later | None | None | None | None | None | None |
| | Antifouling properties | 6 months | 5 | 5 | 5 | 5 | 5 | 5 |
| | | 12 months | 5 | 5 | 5 | 5 | 5 | 5 |

|  |  |  | Example 13 | Example 14 | Example 15 | Comp. Example 1 |
|---|---|---|---|---|---|---|
| Top coating formulation (part by weight, only solid content) | Main agent (X) | Diorganopolysiloxane and silica | 75.4 | 75.4 | 75.4 | 75.7 |
| | | Titanium white and carbon black | 10.8 | 10.8 | 10.8 | 10.8 |
| | Curing agent (Y) | Organosilane partial hydrolysate | 3.8 | 3.8 | 3.8 | 3.8 |
| | | Organopolysiloxane *1 | | | | 8.9 |
| | | Organopolysiloxane *2 | 8.9 | 8.9 | 8.9 | |
| | | Dibutyltin dilaurate | 0.8 | 0.8 | 0.8 | 0.8 |
| Adhesiveness - imparting component (Z) | N-2(Aminoethyl)3-aminopropyltrimethoxysilane | | | | | |
| | N-2(Aminoethyl)3-aminopropyltriethoxysilane | | | | | |
| | N-2(Aminoethyl)3-aminopropylmethyldimethoxysilane | | | | | |

TABLE 4-continued

|  |  |  |  |  |  |  |
|---|---|---|---|---|---|---|
|  |  | 3-Aminopropyl-trimethoxysilane | 0.3 |  |  |  |
|  |  | (3-Trimethoxysilylpropyl)di-ethylenetriamine |  | 0.3 |  |  |
|  |  | (3-Trimethoxysilylpropyl)tri-ethylenetetramine |  |  | 0.3 |  |
|  | Total |  | 100.0 | 100.0 | 100.0 | 100.0 |
| Under coating |  |  | AC-1 | AC-1 | AC-1 | AC-1 |
| Test results | Adhesiveness | Tensile test (Mpa) | 2.2 | 2.4 | 2.4 | 0 |
|  |  | Tape peel test | 0 mm | 0 mm | 0 mm | 10 mm> |
|  |  | Fresh water dipping test, 6 months later | None | None | None | 2 MD |
|  | Antifouling properties | 6 months | 5 | 5 | 5 | No deposition |
|  |  | 12 months | 5 | 4 | 4 | Impossible testing |

*1: Dimethyldiphenyl silicone oil (methyl group: about 95%, phenyl group: about 5%). Viscosity: about 100 mPa · s. $R^a$ represents a methyl group or a phenyl group.
*2: Dimethyldiphenyl silicone oil (methyl group: about 95%, phenyl group: about 5%). Viscosity: about 1000 mpa · s. $R^a$ represents a methyl group or a phenyl group.

Then, adhesiveness at ordinary temperature (23° C.) and a low temperature (0° C.) was examined. The results are listed in Table 5.

(Tape Peel Test 2)

A masking tape (trade name "MASKING TAPE FOR CONSTRUCTION" (manufactured by Nichiban Co., Ltd.)) was pasted on the center of a sandblast steel plate of 100 mm×300 mm×2.3 mm. Then, the above urethane resin paint composition or epoxy resin paint composition was applied on the sandblast steel plate at ordinary temperature (23° C.) or a low temperature (0° C.) using a spray coater (trade name: iwata WIDER SPRAY GUN, model number: W-77-2G) and dried for 6 hours to form an anticorrosive coating film having a dry film thickness of 250 µm. Then, the dried anticorrosive coating film was coated with the antifouling paint composition prepared for any of Examples 16 to 18 and Comparative Example 2 to have a dry film thickness of 300 µm at each temperature using a spray coater (trade name: iwata WIDER SPRAY GUN, model number: W-77-2G) and was dried for 1 day.

The pasted masking tape was removed to form a step (difference in level) on the coating film, followed by strongly rubbing the coating film at the step portion with the ball of a finger and by measuring a size of a peeled portion of the coating film. The size was represented by "maximum peeling distance", which is a maximum distance from an area on the sandblast steel plate where the masking tape was pasted to an end of the peeled portion. Sufficient adhesion results in the maximum peeling distance of 0 mm, while poor adhesion results in the longer distance.

(Fresh Water Dipping Test 2)

An epoxy resin paint composition was applied on a sandblast steel plate of 100 mm×300 mm×2.3 mm at ordinary temperature (23° C.) and a low temperature (0° C.) using a spray coater (trade name: iwata WIDER SPRAY GUN, model number: W-77-2G) to have a thickness of 150 µm. In this case, BANNOH 500 (epoxy anticorrosive paint, manufactured by Chugoku Marine Paints, Ltd.) was used at ordinary temperature and BANNOH 500QD (epoxy anticorrosive paint, manufactured by Chugoku Marine Paints, Ltd.) was used at the low temperature condition, and dried for 1 day to form an anticorrosive coating film, and the urethane resin paint composition or epoxy resin paint composition of 100 µm was applied on the anticorrosive coating film using a spray coater (trade name: iwata WIDER SPRAY GUN, model number: W-77-2G) at ordinary temperature (23° C.) or low temperature (0° C.) to have a thickness of 100 µm and dried for 6 hours. Then, the obtained anticorrosive coating film was coated with the antifouling paint compositions prepared for Examples 16 to 18 and Comparative Example 2 at each temperature (23° C. and 0° C.) using a spray coater (trade name: iwata WIDER SPRAY GUN, model number: W-77-2G) to have a dry film thickness of 300 µm and was dried for 1 day.

The cured composite coating film was dipped in deionized water, which was kept at 23° C., for 6 months. The degree of a generated blister was evaluated by the method specified in ASTM D714. The size and density of a blister according to ASTM D714 were judged on criteria listed in Table 6. For example, a case in which blisters with a size of 8 (significantly small blisters) were moderately distributed was represented by 8M.

TABLE 5

|  |  |  | Example 16 | Example 17 | Example 18 | Comparative Example 2 |
|---|---|---|---|---|---|---|
| Top coating formulation (part by weight, only solid content) | Main agent (X) | Diorganopolysiloxane and silica | 75.5 | 75.5 | 75.5 | 75.5 |
|  |  | Titanium white and carbon black | 10.8 | 10.8 | 10.8 | 10.8 |
|  | Curing agent (Y) | Organosilane partial hydrolysate | 3.8 | 3.8 | 3.8 | 3.8 |
|  |  | Organopolysiloxane *1 | 8.9 | 8.9 | 8.9 | 8.9 |
|  |  | Organopolysiloxane *2 |  |  |  |  |
|  |  | Dibutyltin dilaurate | 0.8 | 0.8 | 0.8 | 0.8 |

TABLE 5-continued

|  |  |  | Example 16 | Example 17 | Example 18 | Comparative Example 2 |
|---|---|---|---|---|---|---|
| | Adhesiveness-imparting component (Z) | N-2(Aminoethyl)3-amino-propyltrimethoxysilane | 0.2 | 0.2 | 0.2 | 0.2 |
| | Total | | 100 | 100 | 100 | 100 |
| Under coating | | | AC-7 | AC-1 Urethane paint | AC-2 | AC-8 Epoxy paint |
| | | | Presence of tertiary amine | Presence of tertiary amine | Small amount of tertiary amine | |
| Test results | | Coating interval time (between intermediate coating and top coating) | | | | |
| | Adhesiveness Tape peel test | At ordinary temperature (23° C.) | 0 mm | 0 mm | 0 mm | 10 mm> |
| | | At low temperature (0° C.) | 0 mm | 0 mm | 0 mm | 10 mm> |
| | Fresh water dipping test 6 months later | At ordinary temperature (23° C.) | None | None | None | 4M |
| | | At low temperature (0° C.) | None | None | 8M | 4M |

*1: Dimethyldiphenyl silicone oil (methyl group: about 95%, phenyl group: about 5%). Viscosity: about 100 mPa·s. $R^a$ represents a methyl group or a phenyl group.
*2: Dimethyldiphenyl silicone oil (methyl group: about 95%, phenyl group: about 5%). Viscosity: about 1000 mPa·s. $R^a$ represents a methyl group or a phenyl group.

TABLE 6

| Density | |
|---|---|
| None | None |
| Less than few | FF |
| Few | F |
| Medium | M |
| Medium-dense | MD |
| Dense | D |

The invention claimed is:

1. An antifouling composite coating film, comprising:
(I) a urethane resin anticorrosive coating film formed from an anticorrosive paint composition comprising a main agent selected from the group consisting of a polyol and a glycidyl ether, and said composition further comprises an isocyanate curing agent and a tertiary amine compound as a catalyst for accelerating curing, and
(II) an antifouling coating film formed from a curable polysiloxane composition comprising components (a), (b), (c), and (f) below,
the urethane resin anticorrosive coating film (I) and the antifouling coating film (II) being laminated,
(a) a diorganopolysiloxane having at least two functional groups in one molecule,
(b) an organosilane having at least two hydroxyl groups or hydrolyzable groups in one molecule represented by formula (2) and/or a partial hydrolysis-condensate thereof:

$$R^8{}_d SiY_{4-d} \quad (2)$$

wherein
$R^8$ represents a hydrocarbon group having 1 to 6 carbon atoms selected from the group consisting of a straight-chain alkyl group, a branched alkyl group, a cyclic alkyl group, and a phenyl group;
Y represents a hydroxyl group or a hydrolyzable group selected from the group consisting of a an iminoxy group, an acetyloxy group, an alkoxy group, an acyloxy group, an amino group, an amide group, and an aminoxy group; and
d is an integer of 0 to 2, (c) an amino group-containing alkoxysilane represented by formula (1) and/or a reaction product thereof:

$$X-R^1-SiR^2{}_n(OR^3)_{3-n} \quad (1)$$

wherein
$R^1$ represents an alkylene group having 1 to 10 carbon atoms;
$R^2$ represents an alkyl group having 1 to 10 carbon atoms, an alkenyl group having 2 to 5 carbon atoms, or an aryl group having 6 to 12 carbon atoms;
$R^3$ represents an alkyl group having 1 to 10 carbon atoms;
X is a group represented by $R^4R^5N-$ or $R^6R^7C=N-$, wherein $R^4$ represents a hydrogen atom, an alkyl group having 1 to 10 carbon atoms, an alkenyl group having 2 to 5 carbon atoms, an aryl group having 6 to 12 carbon atoms, or $H_2N(CH_2)_p(NH(CH_2)_q)_r-$, wherein p and q are integers of 2 to 5, and r is an integer of 0 to 5; $R^5$ represents a hydrogen atom, an alkyl group having 1 to 10 carbon atoms, an alkenyl group having 2 to 5 carbon atoms, or an aryl group having 6 to 12 carbon atoms; and $R^6$ and $R^7$ each independently represent a hydrogen atom, an alkyl group having 1 to 10 carbon atoms, an alkenyl group having 2 to 5 carbon atoms, or an aryl group having 6 to 12 carbon atoms; and
n is an integer of 0 to 2, and
(f) a color pigment.

2. The antifouling composite coating film according to claim 1, wherein the functional groups of the diorganopolysiloxane (a) are selected from the group consisting of a hydroxyl group, an iminoxy group, an amino group, an acetyloxy group, and an alkoxy group.

3. The antifouling composite coating film according to claim 1, wherein Y in the general formula (2) is selected from the group consisting of a hydroxyl group, an iminoxy group, an acetyloxy group, and an alkoxy group.

4. The antifouling composite coating film according to claim 1, wherein the amino group-containing alkoxysilane (c) is γ-aminopropyltrimethoxysilane.

5. The antifouling composite coating film according to claim 1, wherein 0.001 to 5 parts by weight of (c) the amino group-containing alkoxysilane is contained based on 100 parts by weight of the solid contents of the curable polysiloxane composition.

6. The antifouling composite coating film according to claim 1, wherein the main agent is a polyol and the isocyanate curing agent is a polyisocyanate.

7. The antifouling composite coating film according to claim 6, wherein the anticorrosive paint composition has a ratio of the equivalent of an isocyanate group contained in the polyisocyanate to the equivalent of a hydroxyl group contained in the polyol [NCO group/OH group] is 0.3/1.0 to 2.0/1.0.

8. An antifouling substrate comprising a substrate and the antifouling composite coating film according to claim 1 laminated on a surface of the substrate in order of substrate/coating film (I)/coating film (II).

9. The antifouling substrate according to claim 8, wherein the substrate is an underwater structure or a ship.

10. A method for producing an antifouling substrate, comprising laminating the antifouling composite coating film according to claim 1 on a surface of a substrate in order of substrate/coating film (I)/coating film (II).

* * * * *